(12) United States Patent
Kundargi et al.

(10) Patent No.: US 10,686,572 B2
(45) Date of Patent: Jun. 16, 2020

(54) WIRELESS COMMUNICATION SYSTEM THAT PERFORMS MEASUREMENT BASED SELECTION OF PHASE TRACKING REFERENCE SIGNAL (PTRS) PORTS

(71) Applicant: NATIONAL INSTRUMENTS CORPORATION, Austin, TX (US)

(72) Inventors: Nikhil U. Kundargi, Austin, TX (US); Achim Nahler, Dresden (DE)

(73) Assignee: National Instruments Corporation, Austin, TX (US)

( * ) Notice: Subject to any disclaimer, the term of this patent is extended or adjusted under 35 U.S.C. 154(b) by 95 days.

(21) Appl. No.: 15/940,103

(22) Filed: Mar. 29, 2018

(65) Prior Publication Data

US 2018/0287759 A1    Oct. 4, 2018

Related U.S. Application Data

(60) Provisional application No. 62/480,806, filed on Apr. 3, 2017.

(51) Int. Cl.
*H04L 5/00* (2006.01)
*H04L 27/26* (2006.01)
(Continued)

(52) U.S. Cl.
CPC ......... *H04L 5/0048* (2013.01); *H04B 7/0626* (2013.01); *H04L 5/0051* (2013.01);
(Continued)

(58) Field of Classification Search
None
See application file for complete search history.

(56) References Cited

U.S. PATENT DOCUMENTS 7,283,599 B1   10/2007  Herbig
8,325,755 B2   12/2012  Lee et al.
(Continued)

FOREIGN PATENT DOCUMENTS

WO   WO2017084235 A1   5/2017
WO   WO2017192889 A1   11/2017
WO   WO2018026220 A1   2/2018

OTHER PUBLICATIONS

"Final Report of 3GPP TSG RAN WG1 #88bis v1.0.0" MCC Support. 3GPP TSG RAN WG1 Meeting #89, Hangzhou, China. May 15-19, 2017. pp. 1-7. Downloaded from http://www.3gpp.org/ftp/tsg_ran/WG1_RL1/TSGR1_88b/Report/Final_Minutes_report_RAN1%2388b_v100.zip.
(Continued)

*Primary Examiner* — Lonnie V Sweet
(74) *Attorney, Agent, or Firm* — E. Alan Davis; James W. Huffman

(57) ABSTRACT

A base station (BS) having a plurality of antennas transmits a plurality of spatial streams. Each user equipment (UE) of a plurality of UE estimates common phase error (CPE) of each of two or more of the plurality of spatial streams, measures correlations of the estimated CPE among the two or more of the plurality of spatial streams, and provides feedback about the CPE correlations to the BS. The BS uses the CPE correlation feedback to allocate phase tracking reference signal (PTRS) ports and to map the allocated PTRS ports to demodulation reference signal (DMRS) ports corresponding to the plurality of spatial streams.

20 Claims, 14 Drawing Sheets

(51) Int. Cl.
    *H04B 7/06*     (2006.01)
    *H04B 7/04*     (2017.01)
    *H04W 56/00*     (2009.01)
    *H04B 7/0417*     (2017.01)

(52) U.S. Cl.
    CPC ..... *H04L 27/2602* (2013.01); *H04W 56/0035* (2013.01); *H04B 7/0417* (2013.01); *H04L 5/0023* (2013.01); *H04L 27/2613* (2013.01)

(56) References Cited

U.S. PATENT DOCUMENTS

| | | | |
|---|---|---|---|
| 8,457,252 B2* | 6/2013 | Liu | H04L 25/0224 375/260 |
| 9,191,161 B2 | 11/2015 | Li et al. | |
| 9,935,794 B1* | 4/2018 | Cao | H04L 25/0226 |
| 2005/0261028 A1 | 11/2005 | Chitrapu | |
| 2006/0182015 A1 | 8/2006 | Kim | |
| 2007/0206707 A1 | 9/2007 | Chen | |
| 2008/0279306 A1 | 11/2008 | van Zelst et al. | |
| 2013/0094548 A1 | 4/2013 | Park | |
| 2013/0286960 A1 | 10/2013 | Li et al. | |
| 2014/0098689 A1 | 4/2014 | Lee et al. | |
| 2015/0237617 A1* | 8/2015 | Chen | H04B 7/0617 370/329 |
| 2015/0326286 A1 | 11/2015 | Wong et al. | |
| 2015/0326291 A1 | 11/2015 | Wong et al. | |
| 2015/0326383 A1 | 11/2015 | Wong et al. | |
| 2016/0134352 A1 | 5/2016 | Stirling-Gallacher | |
| 2016/0211898 A1 | 7/2016 | Cai | |
| 2016/0337916 A1 | 11/2016 | Deenoo et al. | |
| 2016/0353510 A1 | 12/2016 | Zhang et al. | |
| 2017/0026844 A1* | 1/2017 | Baldemair | H04B 7/0465 |
| 2017/0026938 A1 | 1/2017 | Onggosanusi et al. | |
| 2017/0207845 A1 | 7/2017 | Moon et al. | |
| 2017/0290013 A1 | 10/2017 | McCoy et al. | |
| 2017/0324459 A1 | 11/2017 | Koskela et al. | |
| 2017/0346545 A1 | 11/2017 | Islam et al. | |
| 2017/0367046 A1 | 12/2017 | Papasakellariou | |
| 2018/0042028 A1 | 2/2018 | Nam et al. | |
| 2018/0097556 A1 | 4/2018 | Nagaraja et al. | |
| 2018/0123648 A1 | 5/2018 | Nagaraja et al. | |
| 2018/0198580 A1* | 7/2018 | Nammi | H04L 27/0012 |
| 2018/0198651 A1 | 7/2018 | Kundargi et al. | |
| 2018/0227035 A1 | 8/2018 | Cheng et al. | |
| 2018/0227094 A1 | 8/2018 | Liu et al. | |
| 2018/0234959 A1 | 8/2018 | Ahn et al. | |
| 2018/0279286 A1 | 9/2018 | Akoum et al. | |
| 2018/0317214 A1 | 11/2018 | Ding et al. | |
| 2018/0324678 A1 | 11/2018 | Chen et al. | |
| 2019/0052344 A1 | 2/2019 | Kundargi et al. | |
| 2019/0053072 A1 | 2/2019 | Kundargi et al. | |
| 2019/0074880 A1 | 3/2019 | Frenne et al. | |
| 2019/0090205 A1 | 3/2019 | Gong et al. | |
| 2019/0104549 A1 | 4/2019 | Deng et al. | |
| 2019/0132827 A1 | 5/2019 | Kundargi et al. | |
| 2019/0132828 A1 | 5/2019 | Kundargi et al. | |
| 2019/0349915 A1 | 11/2019 | Ahn et al. | |
| 2020/0059398 A1 | 2/2020 | Pan et al. | |

OTHER PUBLICATIONS

"Final Report of 3GPP TSG RAN WG1 #89 v1.0.0" MCC Support. 3GPP TSG RAN WG1 Meeting #90. Prague, Czech Rep. Aug. 21-25, 2017. pp. 1-8. Downloaded from http://www.3gpp.org/ftp/tsg_ran/WG1_RL1/TSGR1_89/Report/Final_Minutes_report_RAN1%2389_v100.zip.

"Final Report of 3GPP TSG RAN WG1 #AH_NR2 v1.0.0" MCC Support. 3GPP TSG RAN WG1 Meeting #90. Qingdao, China. Jun. 27-30, 2017. pp. 1-8. Downloaded from http://www.3gpp.org/ftp/tsg_ran/WG1_RL1/TSGR1_AH/NR_AH_1706/Report/Final_Minutes_report_RAN1%23AH_NR2_v100.zip.

"Discussion on Nested Usage of RS for Beam Measurement" National Instruments. 3GPP TSG RAN WG1 Meeting #89. Hangzhou, P.R. China May 15-19, 2017. pp. 1-5 Downloaded from http://www.3gpp.org/ftp/tsg_ran/WG1_RL1/TSGR1_89/Docs/R1-1708270.zip.

"On Remaining Aspects of Beam Recovery" National Instruments. 3GPP TSG RAN WG1 Meeting #90. Prague, Czech Republic, Aug. 21-25, 2017. pp. 1-10. Downloaded from http://www.3gpp.org/ftp/tsg_ran/WG1_RL1/TSGR1_90/Docs/R1-1714180.zip.

White Paper. "*802.11ad—WLAN at 60 GHz A Technology Introduction.*" Rohde & Schwarz 1MA220_2e. Nov. 17, 2017 pp. 1-28.

Serpedin, Erchin et al. "*Performance Analysis of Blind Carrier Phase Estimators for General QAM Constellations.*" IEEE Transactions on Signal Processing, vol. 49, No. 8. Aug. 2001. pp. 1816-1823.

Moeneclaey, Marc et al. "*ML-Oriented NDS Carrier Synchronization for General Rotationally Symmetric Signal Constellations.*" IEEE Transactions on Communications, vol. 42, No. 8, Aug. 1994. pp. 2531-2533.

Thomas, Timothy A. et al. "*Blind Phase Noise Mitigation for a 72 GHz Millimeter Wave System.*" IEEE Icc 2015 SAC-Millimeter-wave Communications. 2015 pp. 1352-1357.

Vieira et al. "*Reciprocity Calibration Methods for Massive MIMO Based on Antenna Coupling.*" Department of Electrical Engineering, Lund University. 5pp. Jan. 1, 2014.

Harris, "*University of Bristol and Lund University Partner with NI to Set World Records in 5G Wireless Spectral Efficiency Using Massive MIMO.*" 7 pp. May 2016.

"*LTE in a Nutshell—Physical Layer.*" Telesystem Innovations Inc. White Paper. 18pp. 2010.

"*An Introduction to Orthogonal Frequency Division Multiplex Technology.*" Keithley Instruments, Inc. 66pp. 2008.

Huawei et al. "*WF on CSI Acquisition in NR.*" 3GPP TSG RAB WGI Meeting #85, 4pp. May 27, 2016.

Huawei et al. "*WF on CSI Acquisition Framework in NR.*" 35PP TSG RAN WG1 Meeting #85, 3pp. May 27, 2016.

"*Study on Latency Reduction Techniques for LTE.*" 3GPP TR 36.881 Technical Report, 92pp. Feb. 2016.

"*Study on Scenarios and Requirements for Next Generation Access Technologies.*" 3GPP TR 38.913 Technical Report, 19 pp. Feb. 2016.

Vieira et al. "*A Flexible 100-antenna Testbed for Massive MIMO.*" Department of Electrical and Information Technology at Lund University. 7pp. Jan. 1, 2014.

"*Bristol and Lund set a New World Record in 5G Wireless Spectrum Efficiency.*" University of Bristol News. 6pp. Mar. 23, 2016.

"*Study on NR New Radio Access Technology.*" 3GPP TSG RAN Meeting #71, 8pp. Mar. 2016.

Working Group Communication Architectures and Technologies. "*LTE Small Cell Enhancement by Dual Connectivity.*" Wireless World Research Forum. 22pp. Nov. 2014.

White Paper. "*LTE in a Nutshell: Protocol Architecture.*" Telesystem Innovations Inc. 12pp. 2010.

"*LTE Random Access Procedure.*" EventHelix.com Inc., 5pp 2015.

Luther, "*5G Massive MIMO Testbed: From Theory to Reality.*" National Instruments. Jun. 8, 2016, pp. 1-11.

"*Introduction to the NI mm Wave Transceiver System Hardware.*" National Instruments. Apr. 20, 2016, pp. 1-8.

"*National Instruments Wireless Research Handbook.*" National Instruments. May 2016, pp. 1-37.

Shepard et al. "*Argos: Practical Many-Antenna Base Stations.*" MobiCom 12, Aug. 22-26, 2012. Istanbul, Turkey. pp. 53-64.

Khoolenjani et al. "*Distribution of the Ratio of Normal and Rice Random Variables.*" Digital Commons @WayneState, Journal of Modern Applied Statistical Methods, vol. 12, Is2, Article 27. Nov. 1, 2013. pp. 1-15.

Shen et al. "*Channel Estimation in OFDM Systems.*" Freescale Semiconductor, Inc. Application Note. Jan. 2006. pp. 1-16.

"*Study of Time & Frequency Density of UE-Specific & Cell-Specific Phase Noise RS with Different CPE Estimation Techniques.*" National Instruments, 3GPP TSG RAN WG1 Nr Ad-Hoc Meeting, Spokane, WA, USA. Jan. 16-20, 2017. R1-1700854. pp. 1-12.

(56) References Cited

OTHER PUBLICATIONS

"*Discussion on Signaling for PT-RS.*" National Instruments, 3GPP TSG RAN WG1 Meeting #88bis, Spokane, WA, USA. Apr. 3-7, 2017. R1-1705253. pp. 1-10.
Qualcomm. "Beam Management for NR." R1-1705581 3rd Generation Partnership Project (3GPP) vol. RAN WG1. Apr. 2, 2017 pp. 1-7 Retrieved from http://www.3gpp.org/ftp/Meetings_3GPP_SYNC/RAN1/Docs/.
Catt. "Details of Downlink Beam Management." R1-1704551 3rd Generation Partnership Project (3GPP) vol. RAN WG1. Apr. 2, 2017. pp. 1-8. Retrieved from http://www.3gpp.org/ftp/Meetings_3GPP_SYNC/RAN1/Docs/.
Samsung."RRM Measurement in NR: The Details of Filtering." R2-1703721 3rd Generation Partnership Project (3GPP). vol. RAN WG2. Apr. 3, 2017. pp. 1- Retrieved from http://www.3gpp.org/ftp/Meetings_3GPP_SYNC/RAN2/Docs/.
Ng, Boon Loong. "5G NR mmWAVE Standards." Samsung Research America Keynote. Jul. 2017 pp. 1-10.
"Study on New Radio Access Technology Physical Layer Aspects." 3GPP A Global Initiative. 3rd Generation Partnership Project; Technical Specification Group Radio Access Network. 3GPP TR 38.802 V14.0.0. Mar. 2017. pp. 15-17.
"Beam Management Considerations for Above 6 GHz NR." MediaTek Inc. 3GPP TSG RAN WG1 Meeting #86, Gothenburg, Sweden. Aug. 22-26, 2016. R1-167543. pp. 1-4.
BPL Definition and Characteristics defined within an email between Zhangxi and Mihai Enescu. PDF downloaded on Mar. 22, 2018 from https://list.etsi.org/scripts/wa.exe?A3=ind1704A&L=3GPP TSG RAN WG1 NR&E=base64&P=105463584&B=---_000_HE1PR0701MB2074406F6853497D0CA12813996-D0HE1PR0701MB2074_&T=text%2Fhtml;%20charset=utf-8&pending=.

\* cited by examiner

FIG. 6A

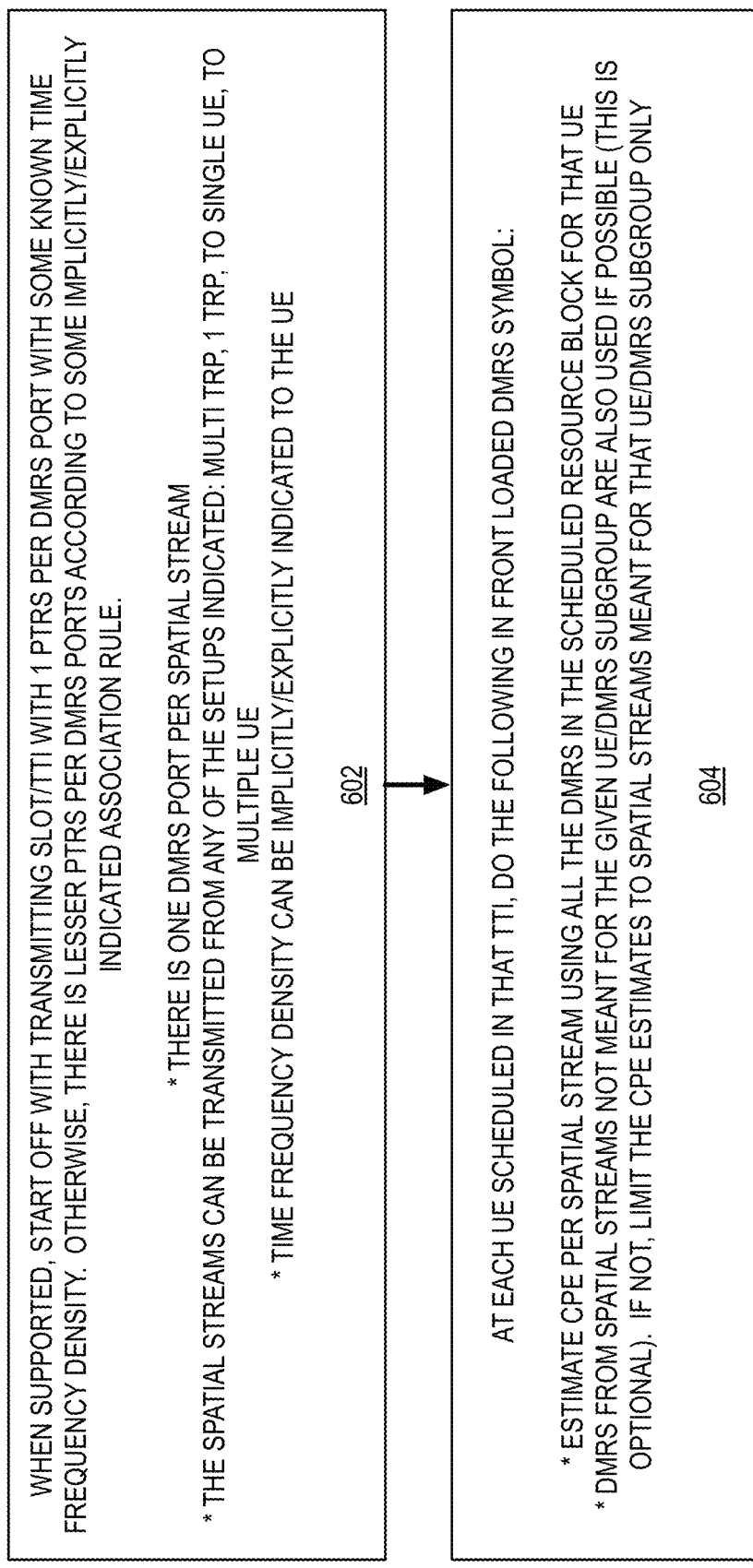

WHEN SUPPORTED, START OFF WITH TRANSMITTING SLOT/TTI WITH 1 PTRS PER DMRS PORT WITH SOME KNOWN TIME FREQUENCY DENSITY. OTHERWISE, THERE IS LESSER PTRS PER DMRS PORTS ACCORDING TO SOME IMPLICITLY/EXPLICITLY INDICATED ASSOCIATION RULE.

* THERE IS ONE DMRS PORT PER SPATIAL STREAM
* THE SPATIAL STREAMS CAN BE TRANSMITTED FROM ANY OF THE SETUPS INDICATED: MULTI TRP, 1 TRP, TO SINGLE UE, TO MULTIPLE UE
* TIME FREQUENCY DENSITY CAN BE IMPLICITLY/EXPLICITLY INDICATED TO THE UE

602

AT EACH UE SCHEDULED IN THAT TTI, DO THE FOLLOWING IN FRONT LOADED DMRS SYMBOL:

* ESTIMATE CPE PER SPATIAL STREAM USING ALL THE DMRS IN THE SCHEDULED RESOURCE BLOCK FOR THAT UE
* DMRS FROM SPATIAL STREAMS NOT MEANT FOR THE GIVEN UE/DMRS SUBGROUP ARE ALSO USED IF POSSIBLE (THIS IS OPTIONAL). IF NOT, LIMIT THE CPE ESTIMATES TO SPATIAL STREAMS MEANT FOR THAT UE/DMRS SUBGROUP ONLY

FROM FIG. 6A →

AT EACH UE SCHEDULED IN THAT TTI, DO THE FOLLOWING IN THE SYMBOLS THAT HAVE PTRS (SPECIAL CASE IS IF EVERY PDSCH SYMBOL HAS A PTRS):
* ESTIMATE CPE PER SPATIAL STREAM USING ALL THE PTRS IN THE SCHEDULED RESOURCE BLOCKS FOR THAT UE
* PTRS FROM SPATIAL STREAMS NOT MEANT FOR THE GIVEN UE ARE ALSO USED IF POSSIBLE (THIS IS OPTIONAL). IF NOT, LIMIT THE CPE ESTIMATES TO SPATIAL STREAM MEANT FOR THAT UE ONLY
606

→

AT EACH UE SCHEDULED IN THAT TTI, IF ADDITIONAL (NON FRONT LOADED) DMRS SYMBOL PRESENT:
* ESTIMATE CPE PER SPATIAL STREAM USING ALL THE DMRS IN THE SCHEDULED RESOURCE BLOCK FOR THAT UE
* DMRS FROM SPATIAL STREAMS NOT MEANT FOR THE GIVEN UE/DMRS SUBGROUP ARE ALSO USED IF POSSIBLE (THIS IS OPTIONAL). IF NOT, LIMIT THE CPE ESTIMATES TO SPATIAL STREAM MEANT FOR THAT UE/DMRS SUBGROUP ONLY
608

→

IF SOME SYMBOLS IN THE TTI CONTAIN A CSI-RS TRANSMISSION:
* USE CSI-RS TO DERIVE CPE IF SUFFICIENT NUMBER OF CSI-RS ARE AVAILABLE TO ACHIEVE RELIABLE CPE ESTIMATION
609

→

AT EACH UE SCHEDULED IN THAT TTI, IF PDSCH SYMBOL HAS NO DMRS OR PTRS OR CSI-RS, THEN ESTIMATE THE CPE WITH BLIND METHOD
* THIS IS DONE ONLY IN SPATIAL STREAM MEANT FOR THAT UE.
611

→ TO FIG. 6C

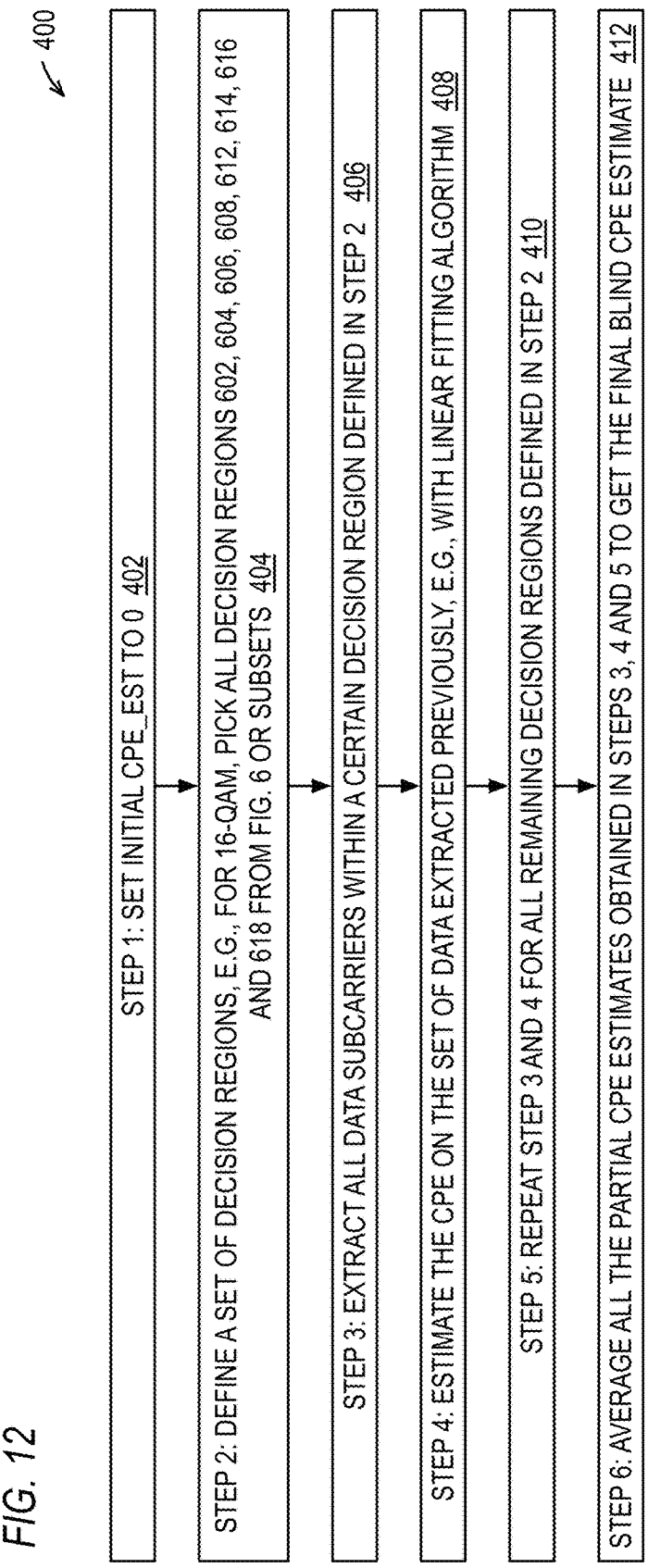
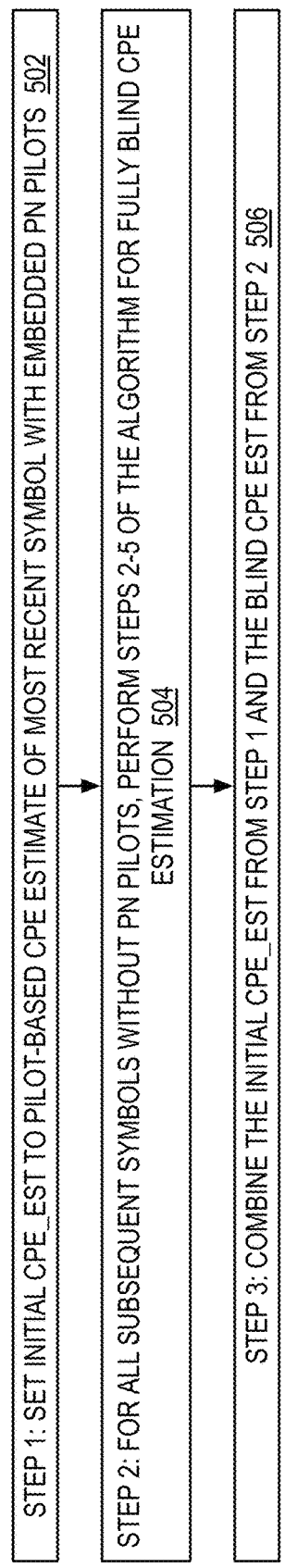
FIG. 12
FIG. 13

WIRELESS COMMUNICATION SYSTEM THAT PERFORMS MEASUREMENT BASED SELECTION OF PHASE TRACKING REFERENCE SIGNAL (PTRS) PORTS

This application claims priority based on U.S. Provisional Application Ser. No. 62/480,806, filed Apr. 3, 2017, entitled MEASUREMENT BASED SELECTION OF PHASE TRACKING REFERENCE SIGNAL (PT-RS) PORTS FOR WIRELESS COMMUNICATION SYSTEMS, which is hereby incorporated by reference in its entirety.

TECHNICAL FIELD

The disclosed embodiments relate to mobile telecommunications.

BACKGROUND

The New Radio (NR) definition in 3GPP (3rd Generation Partnership Project) for mobile systems will encompass a variety of deployment scenarios envisioned for 5G (fifth generation) mobile communication systems. MIMO (multiple input, multiple output) communication systems can be used for 5G TDD (time division duplex) air interfaces. Flexible (scalable) frame structures are being considered for block symbol transmissions within the new 5G cellular communication standard including various frame structure parameters such as FFT (fast Fourier transform) size, sample rate, and subframe length.

FIG. 1A (Prior Art) is a diagram of an example embodiment including a base station 102 with M antennas 104 that provides a wireless MIMO communication system 100. The MIMO base station 102 communicates through its M antennas 104 with K different user equipment (UE) devices 106, such as mobile handsets, having one or more antennas 108. Spectral efficiency is improved by using massive MIMO communication systems having base stations with relatively large numbers of antennas. Example embodiments for massive MIMO communication systems are described within U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety.

FIG. 1B (Prior Art) provides a diagram of an example time-domain subframe structure for the LTE (long term evolution) wireless cellular communication standard including a common subframe 102 and OFDM (orthogonal frequency division multiplex) symbols 108. For example, with respect to the 20 MHz (mega-Hertz) bandwidth LTE mode with a normal cyclic prefix 114 and a sampling rate of 30.72 MSps (mega samples per second), one example subframe structure can be parameterized as follows:

OFDM symbol 108 length: 2048 samples;
common cyclic prefix (CP) 114 length: 144 samples;
special cyclic prefix (CP) 112 length: 160 samples
multiple OFDM symbols 108 (with CP); and
subframe 102 length: 1 ms (millisecond) including 14 OFDM symbols (with CP).

One objective for the 5G air interfaces is to operate from below 1 GHz to 100 GHz carrier frequencies over a large variety of deployment scenarios in a single technical framework, for example, using OFDM (orthogonal frequency division multiplexing) modulation. For this objective, phase noise (PN) becomes a major impairment at carrier frequencies above 6 GHz. Phase noise introduces two kinds of impairment on OFDM-based systems: (1) common phase error (CPE) and (2) inter-carrier interference (ICI). CPE is a common phase rotation across all of the subcarriers for an OFDM transmission, and CPE manifests as a common rotation of the demodulated constellation. The phase noise at each subcarrier frequency also introduces ICI to the neighboring subcarriers, and this spectral leakage degrades the orthogonality of the OFDM waveform. This degradation is manifested as a "fuzziness" in each demodulated constellation point, and the level of ICI can be measured by the degradation of the EVM (Error Vector Magnitude) of the communication link. Phase noise typically increases with the carrier frequency, for example, one general assumption is that PSD (power spectrum density) associated with phase noise increases by about 20 dB per decade of frequency.

CPE can be estimated in a straightforward manner with a least squares estimator according to the equation shown below.

$$\hat{J}_0(m) = \frac{\sum_{k \in S_p} R_k(m) X_k^*(m) H_k^*(m)}{\sum_{k \in S_p} |X_k(m) H_k(m)|^2}.$$

For this equation, $R_k$ is the received subcarrier values; $X_k$, where $k \in S_p$, is the transmitted pilot symbol that is known at the receiver; $H_k$ is the channel estimate; and $S_p$ is the subset of the subcarriers occupied by the pilot. The CPE for each OFDM symbol within an OFDM transmission is the DC component of the DFT (discrete Fourier transform) of the baseband PN (Phase Noise) samples over that symbol duration.

As CPE is constant for all subcarriers within an OFDM symbol and can be estimated, CPE compensation can be performed with the introduction of Phase Noise Reference Signals (PNRS), also called Phase Tracking Reference Signals (PTRS), or other pilots within the OFDM transmissions. The addition of the PNRS/PTRS, therefore, allows for CPE compensation but only at the expense of additional pilot signal overhead within the OFDM symbols. This CPE estimation based on a static pilot pattern, therefore, has the drawback of high overhead due to required pilot signaling for the purely pilot aided PN compensation. Moreover, different devices and deployment scenarios have different levels of requirement for the PN (phase noise) mitigation. For example, UEs (user equipment) and base stations have significantly different phase noise PSD requirements, and UEs can be categorized into different groups with respect to PN performance based on their frequency band of operation and wireless system application, such as eMBB (enhanced Mobile BroadBand), URLLC (ultra-reliable low latency communications), mMTC (massive machine type communications), and/or other use cases.

It is noted that the terminology Phase Noise Reference Signal (PNRS) is used herein interchangeably with Phase Tracking Reference Signal (PTRS) to refer to the same signal. In addition to OFDM waveforms, PNRS/PTRS can also be inserted in SC (Single Carrier) waveforms in a straightforward manner to estimate and compensate the complete PN (Phase Noise) over that SC waveform. Examples of such single carrier waveforms include Single Carrier Frequency Division Multiple Access (SC-FDMA), DFT spread OFDM (DFT-s-OFDM), Null Cyclic Prefix Single Carrier (NCP-SC), etc.

PTRS (phase tracking-reference signal) ports and related signals can be used by base stations(s) to allow the UEs to derive a scalar estimation of the common phase error (CPE) due to the phase noise process which is assumed to be constant over all of the subcarriers of a given symbol of the allocated UE bandwidth. This estimate becomes more accurate with increasing the number of REs (resource elements) allocated to PTRS within the scheduled bandwidth of the given UE. In addition, when multiple antenna ports are used to transmit from the base station(s) to the UE, there can be one-to-one mapping or many-to-one mapping from the DMRS (demodulation reference signal) ports to the PTRS ports. The DMRS ports are used by the base station(s) to provide signals that facilitate demodulation operations within the UEs. While the use of PTRS ports and related communications can help improve CPE compensation, they can also lead to inefficiencies with respect to the use of available bandwidth and difficulties arise in the selection and allocation of the PTRS ports by the base station(s).

BRIEF SUMMARY

In one aspect, the invention provides a wireless base station (BS) that includes a plurality of radio frequency (RF) chains mapped to a plurality of antennas and one or more local oscillators (LO) configured to generate LO signals for provision to the RF chains. The BS transmits a plurality of spatial streams from the plurality of antennas and receives feedback about correlations of common phase error (CPE) estimates among the plurality of spatial streams from a plurality of user equipment (UE). The BS uses the CPE correlation feedback to allocate phase tracking reference signal (PTRS) ports and to map the allocated PTRS ports to demodulation reference signal (DMRS) ports corresponding to the plurality of spatial streams.

In another aspect, the invention provides a user equipment (UE) that includes one or more radio frequency (RF) chains mapped to one or more antennas and one or more local oscillators (LO) configured to generate LO signals for provision to the one or more RF chains. The UE receives a plurality of spatial streams transmitted from a base station (BS) and estimates common phase error (CPE) of each of the plurality of spatial streams. The UE measures correlations of the estimated CPE among the plurality of spatial streams and provides feedback about the CPE correlations to the BS for use by the BS to allocate phase tracking reference signal (PTRS) ports and to map the allocated PTRS ports to demodulation reference signal (DMRS) ports corresponding to the plurality of spatial streams.

In yet another aspect, the invention provides a method that includes a base station (BS) having a plurality of antennas transmitting a plurality of spatial streams. The method further includes each user equipment (UE) of a plurality of UE estimating common phase error (CPE) of each of two or more of the plurality of spatial streams, measuring correlations of the estimated CPE among the two or more of the plurality of spatial streams, and providing feedback about the CPE correlations to the BS. The method further includes the BS using the CPE correlation feedback to allocate phase tracking reference signal (PTRS) ports and to map the allocated PTRS ports to demodulation reference signal (DMRS) ports corresponding to the plurality of spatial streams.

DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

FIG. 12 is a process flow diagram of an example embodiment for a blind only CPE estimation algorithm for the CPE estimator.

FIG. 13 is a process flow diagram of an example embodiment for a pilot aided blind CPE estimation algorithm for the CPE estimator.

DETAILED DESCRIPTION

Terms

Figure 1A:
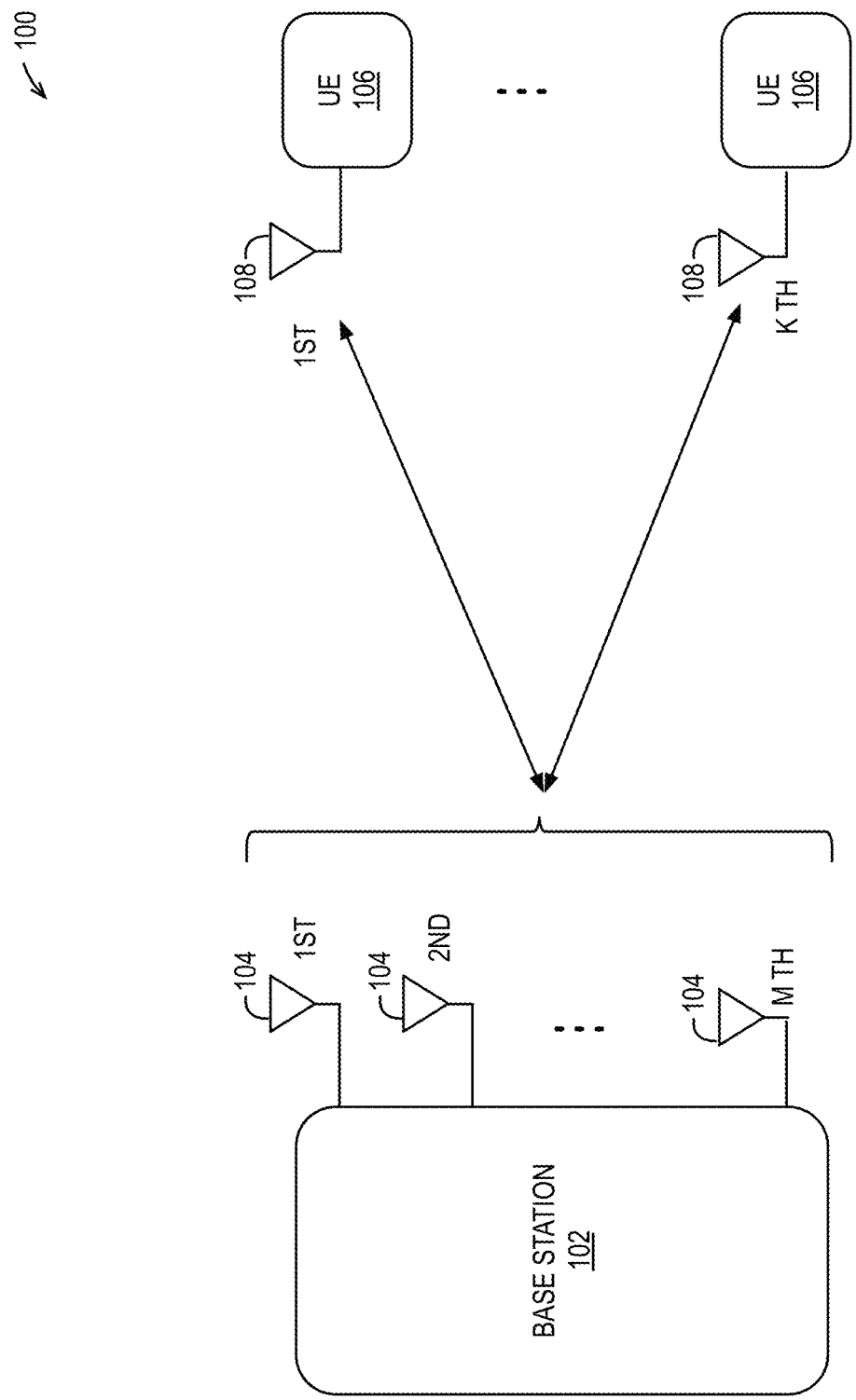
FIG. 1A (Prior Art) is a diagram of an example embodiment including a base station with M antennas that provides a wireless MIMO communication system.
Figure 1B:
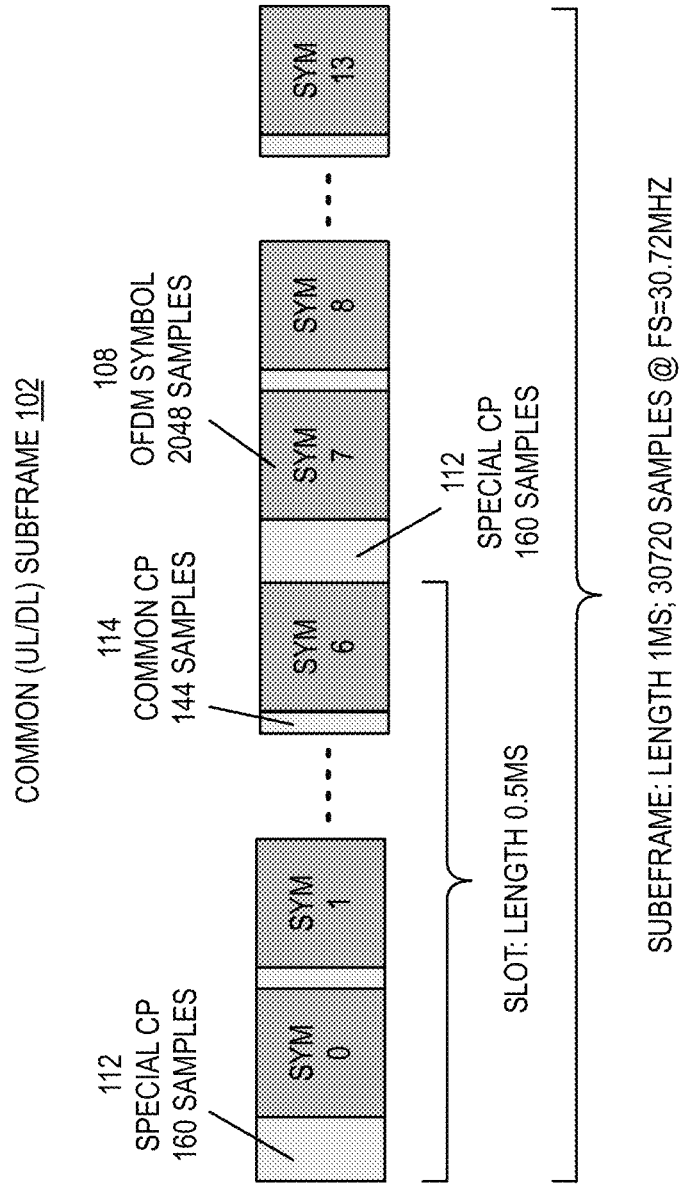
FIG. 1B (Prior Art) provides a diagram of an example time-domain subframe structure for the LTE (long term evolution) wireless cellular communication standard including a common subframe and OFDM (orthogonal frequency division multiplex) symbols.

The following is a glossary of terms used in the present application:

A spatial stream is a sequence of symbols transmitted from an antenna port. The term spatial stream is used in the present disclosure in the context of spatial multiplexing. Spatial multiplexing is a transmission technique used in a MIMO (multiple input multiple output) wireless communication system in which multiple spatial streams are transmitted from the multiple transmit antenna ports of the MIMO system.

An antenna port is defined such that the physical channel over which a symbol on the antenna port is conveyed can be inferred from the physical channel over which another symbol on the same antenna port is conveyed. For example, an antenna port may convey a DMRS over a channel, and the antenna port may convey on the channel a corresponding spatial stream whose symbols are demodulated using the channel estimate obtained from the received DMRS. For another example, an antenna port may convey a PTRS over a channel, and the antenna port may convey on the channel a corresponding spatial stream whose symbols having phase noise tracked and compensated using the PTRS.

A symbol is a complex-valued signal transmitted over a space-time-frequency resource. Examples of OFDM symbols are DMRS, SRS (Sounding Reference Signal), data channel symbols and control channel symbols.

A physical channel is an uplink or downlink physical channel. A physical channel corresponds to a set of resource elements carrying information originating from the higher layers of a communication protocol stack. Examples of channels are PDSCH (physical downlink shared channel), PUSCH (physical uplink shared channel), PDCCH (physical downlink control channel), PUCCH (physical uplink control channel), and PBCH (physical broadcast channel).

A resource element is an element in an OFDM resource grid for an antenna port and subcarrier spacing configuration.

CPE (common phase error) is a common phase rotation across all of the subcarriers for an OFDM transmission.

Phase noise is partial random phase variation over time in a signal. Typically, phase noise is introduced by non-ideal sinusoidal signals generated by oscillators.

A DMRS is a demodulation reference signal which is used for channel estimation purposes in order to allow demodulation of one or more physical channels, e.g., PDSCH, PUSCH PDCCH, PUCCH, PBCH.

A DMRS port is an antenna port over which a DMRS is transmitted and can be used to receive the data symbols transmitted on the same antenna port.

A PTRS is a phase tracking reference signal which is used to track and compensate for the impact of phase noise. A PTRS is also referred to herein as a PNRS (phase noise reference signal). The described embodiments advantageously facilitate a reduction in the number of DMRS ports (and their corresponding spatial streams) upon which PTRS need be transmitted when CPE correlation between one or more spatial streams is detected. This is particularly advantageous because PTRS generally need to be transmitted densely in time. Generally speaking, relative to DMRS, for example, PTRS need to be transmitted relatively densely in time because phase noise tends to vary more frequently over time than the channel estimate obtained from the DMRS. Thus, for example, it may be sufficient for one DMRS to be sent per slot/TTI; whereas, typically multiple PTRS need to be sent per slot/TTI, often within each symbol thereof.

A PTRS port is an antenna port over which a PTRS is transmitted.

A CSI-RS is a channel state information reference signal which is used to calculate the channel state information.

A CSI-RS port is an antenna port over which a CSI-RS is transmitted.

The disclosed embodiments provide techniques for UEs (user equipment) to measure CPE (common phase error) correlations among different receive (or transmit) spatial streams and then to provide feedback to base station(s) (e.g., gNB) with respect to these cross correlations. For one example embodiment, the feedback includes the results of the cross correlations such as a correlation matrix or a condensed/transformed version of it. For one other example embodiment, the feedback includes a selection by the UE of recommended PTRS ports to be associated with its DMRS ports, and this recommended port list is transmitted back to the base station(s). The base station(s) (e.g., gNB) then use this cross correlation feedback to select and configure the PTRS ports used for one or more UEs. Other variations can also be implemented while still taking advantage of the techniques described herein. The described techniques for selecting PTRS ports may improve the operation of wireless telecommunication systems by enabling them to improve CPE compensation and to more efficiently use available bandwidth.

Example Communication Environments for the Disclosed Embodiments

With respect to the descriptions provided herein, the following abbreviations are used:
PTRS: Phase Tracking Reference Signal
DMRS: Demodulation Reference Signal
TRP: Transmission Reception Point
gNB: g NodeB (base station)
PSD: Power Spectral Density
PN: Phase Noise
TTI: Transmission Time Interval, the minimum scheduling interval for a UE Example Architectures of Base Station (BS) and User Equipment (UE)

The following are example architectures that can be used for base station (BS) and user equipment (UE) implementations within a wireless communication system. As these are example embodiments, it is understood that additional and/or different architectures could be used.

At the TRP the following are example architectures:
One antenna panel only
　One LO (local oscillator) shared between all antennas of the panel
　Multiple LOs shared between the antennas of the panel
　　With common clock
Multiple antenna panels
　One LO shared between all antenna panels
　One LO per antenna panel
　　With common clock shared between all LOs
　　Separate clock for each/some of the LOs
　Multiple LOs per panel
　　Common clock per panel
　　One clock for all the LOs in that antenna panel
With Multiple TRP joint transmission of some category (Non Coherent Joint Transmission (NCJT), Dynamic Point Selection (DPS), Coordinated Multi-Point (CoMP), etc.), there are multiple TRPs and/or multiple gNBs that can communicate to an UE in a coordinated manner. In such cases, the example architecture can have:
Separate LO(s) per TRP, different clock(s) per TRP
Each of the sub options per TRP as given in previous list
At the UE the following are example architectures:
One antenna panel only
One LO (local oscillator) shared between all antennas of the panel
Multiple antenna panels
One LO shared between all antenna panels
One LO per antenna panel
With common clock shared between all LOs
Separate clock for each/some of the LOs In addition to antennas and panels, there are digital transceiver chains, which are mapped to the antennas/panels using an antenna mapping matrix. Additional and/or different circuitry and components can also be included while still taking advantage of the techniques disclosed herein.

Figure 2:
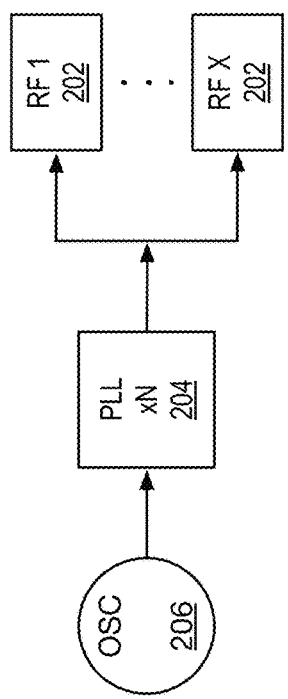
FIGS. 2-4 provide example embodiments for different implementations where clock signals and related circuitry are used as LOs for RF channels within downlink (DL) and/or uplink (UL) circuitry for base stations or UEs.
Figure 4:
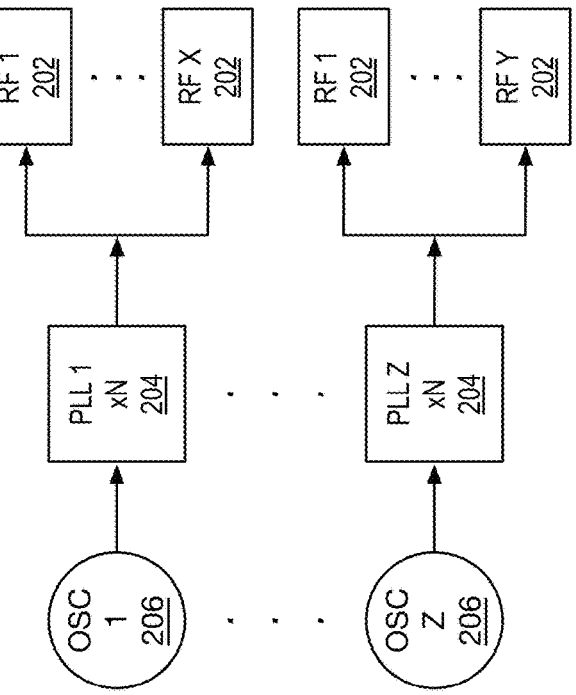
Figure 3:
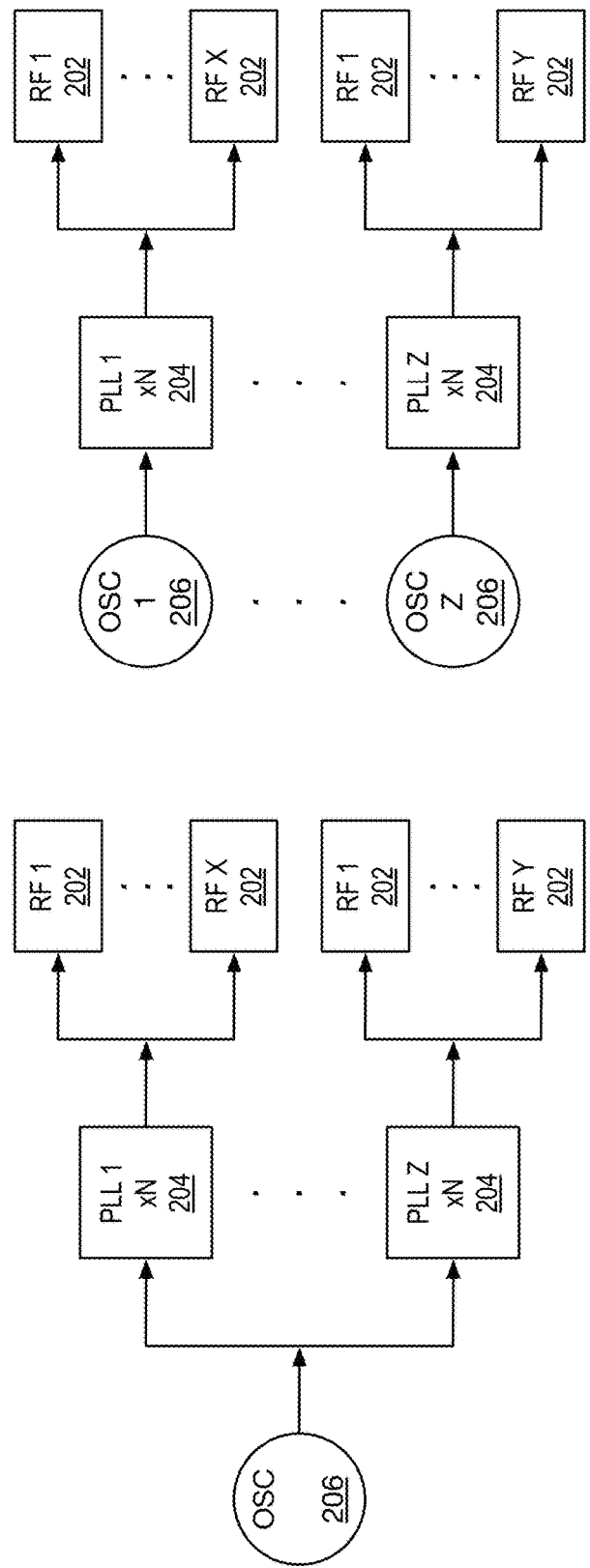

FIGS. 2-4 provide example embodiments for different implementations where clock signals and related circuitry are used as LOs for RF channels within downlink (DL) and/or uplink (UL) circuitry for base stations or UEs. It is noted that the LO signals can be used, for example, to mix RF signals up to higher frequencies and/or to mix RF signals down to lower frequencies within the DL and/or UL circuitry for base stations or UEs.

FIG. 2 is a block diagram of an example embodiment where the same clock, which can be generated by oscillator (OSC) 206, and the same PLL (phase lock loop) 204, which can be a divide-by-N based PLL (xN), are used as a single LO to generate LO signals that are provided to multiple different RF channels ($RF_1 \ldots RF_X$) 202.

FIG. 3 is a block diagram of an example embodiment where the same clock, which can be generated by oscillator (OSC) 206, is used as an input to multiple different PLLs ($PLL_1 \ldots PLL_Z$) 204, which can each be a divide-by-N based PLL (xN). These different PLLs 204 in combination with the clock are used as different LOs to generate multiple LO signals that are provided to multiple sets of different RF channels ($RF_1 \ldots RF_X$, $RF_1 \ldots RF_Y$) 202.

FIG. 4 is a block diagram of an example embodiment where multiple clocks, which can be generated by multiple oscillators ($OSC_1 \ldots OSC_Z$) 206, are used as inputs to multiple different PLLs ($PLL_1 \ldots PLL_Z$) 204, which can each be a divide-by-N based PLL (xN). These different PLLs 204 in combination with the different clocks are used as different LOs to generate multiple LO signals that are provided to multiple sets of different RF channels ($RF_1 \ldots RF_X$, $RF_1 \ldots RF_Y$) 202.

As explained in further detail below, depending on the architecture implemented for the base stations and/or UEs, the Phase Noise (PN) characteristics are different. Further, the downlink (DL) parts and the uplink (UL) parts of the implementations can also have different PN characteristics and should therefore be considered separately.

Example of Different Varieties of MIMO Transmissions
A base station (BS) for a MIMO communication system will set up multiple spatial streams. The following are examples of communication systems with such multiple spatial streams:
SU-MIMO (Single User-MIMO)
Single TRP
Multi TRP
MU-MIMO (Multi-User MIMO)
Single TRP
Multi TRP For each of these spatial stream examples, the UE communicating with the base station can be implemented as a SISO (single input, single output) device or as a MIMO device.

Also for MIMO systems, there is a mapping between the spatial streams and the transceiver architectures. To simplify the discussions below, the following assumptions are applied, although it is understood that the techniques described herein can be applied to other combinations in straight forward manner.
SS stands for Spatial Stream; TRX stands for Transceiver chain
Mapping of SS to Antennas
One SS is mapped within one antenna panel (e.g., the SS is not shared between the antennas on two or more panels)
OR One SS is mapped to multiple antenna panels
More than one SS can be mapped to one antenna panel
One SS transmission involves only one LO
Within a TRP, the SS are mapped to TRX such that each SS has only one LO
Multiple SS can share an LO While the current NR definition supports up to 12 SS, there are discussions to extend it to 16 SS (e.g., by supporting 16 orthogonal DMRS ports). The techniques described herein can be scaled up to 16 SS but are not limited to 16 SS. The disclosed techniques can be used for systems with more than 16 SS as well.

Characteristics of Phase Noise
To describe the phase noise in the system:
Total phase noise PSD is the combination of the PSD at TX and PSD at RX.
Usually UE will have a lot worse PSD than TRP due to the relative difference in quality of RF chains at UE and TRP.
The UEs in the network will be categorized into UE categories depending on this RF quality and other transmission capabilities of that UE. That UE category and/or UE capability and/or UE feature is expected to reflect the PSD quality to some level.
In an OFDM system, the Phase Noise impact is measured on a per symbol level via:
CPE (Common Phase Error)
ICI (Inter Carrier Interference)
The PSD of Phase Noise is a combination of:
PSD of PN of Clock
PSD of PN of PLL Loop Filter
PSD outside the Loop Filter BW Now, to compensate the PN for OFDM at less than 40 GHz, estimating and compensating for CPE is sufficient. CPE is different for each symbol, and is a random variable in time, following a type of random walk process. The 40 GHz upper bound is an example of current RF technology; however, it should be understood that the upper bound will likely shift in the future as RF technology progresses.

Measurement of the Phase Noise Between Spatial Streams

Descriptors of Phase Noise Correlation
Depending on the clocks and LOs involved and their mapping to the antenna elements, the Phase Noise process of different SS can be correlated to different degrees. As such, the following are characterized:
Dependence of the complete phase noise between SS
Dependence of the CPE between SS
With respect to dependence of the phase noise between SS, it is desirable to estimate exact PN samples over time/SC (subcarrier) per SS and then find the cross correlation between the SS of this complete PN process. These will include the impact of CPE and ICI.

With respect to dependence of the CPE between SS, there are a number of options to characterize it as provided below. First, CPE is found for a symbol for each SS. Then, the following options can be performed:
  Compare the instantaneous CPE per SS in that symbol:
    If all SS are completely correlated, then this CPE should be the same.
    If there is partial correlation among some SS, but not the others, then the CPE of those SS should be similar while that of the uncorrelated SS will be different.
  Compare the time series of instantaneous CPE per SS over multiple symbols in the TTI:
    There are multiple ways to find the CPE in a symbol per SS.
    If the CPE is estimated over N symbols out of M in the TTI, then the time series of CPE is obtained per SS.
    The cross correlation of the CPE over all or some of the SS can then be calculated.
  Compare over multiple TTIs:
    Knowledge from past TTIs in which the UE has been scheduled can be used to get more sample points for estimating the CPE.
Methods to Estimate the CPE It is proposed to use a toolkit of methods to estimate the CPE depending on the symbol number and structure. They are introduced here with more details being provided below.
  DMRS (demodulation-reference signal) based
    Use the DMRS which is either front loaded or also can be in middle of the slot
  PTRS based
    Use the PTRS in the PDSCH (physical downlink shared channel)
  CSI-RS (channel state information-reference signal) based
    The CSI-RS can be used, present again in PDSCH
  Blind data based
    The previously presented and patented blind data based methods can be used in symbols.

Depending on the numerology and frame structure, each symbol in the TTI can support all or some of the above methods. Using all or some of the methods listed above, one can estimate the CPE time series in a TTI. Then, using one of the CPE cross correlation methods listed above, one can estimate to what degree the phase noise between the SS is correlated.

Figure 5:
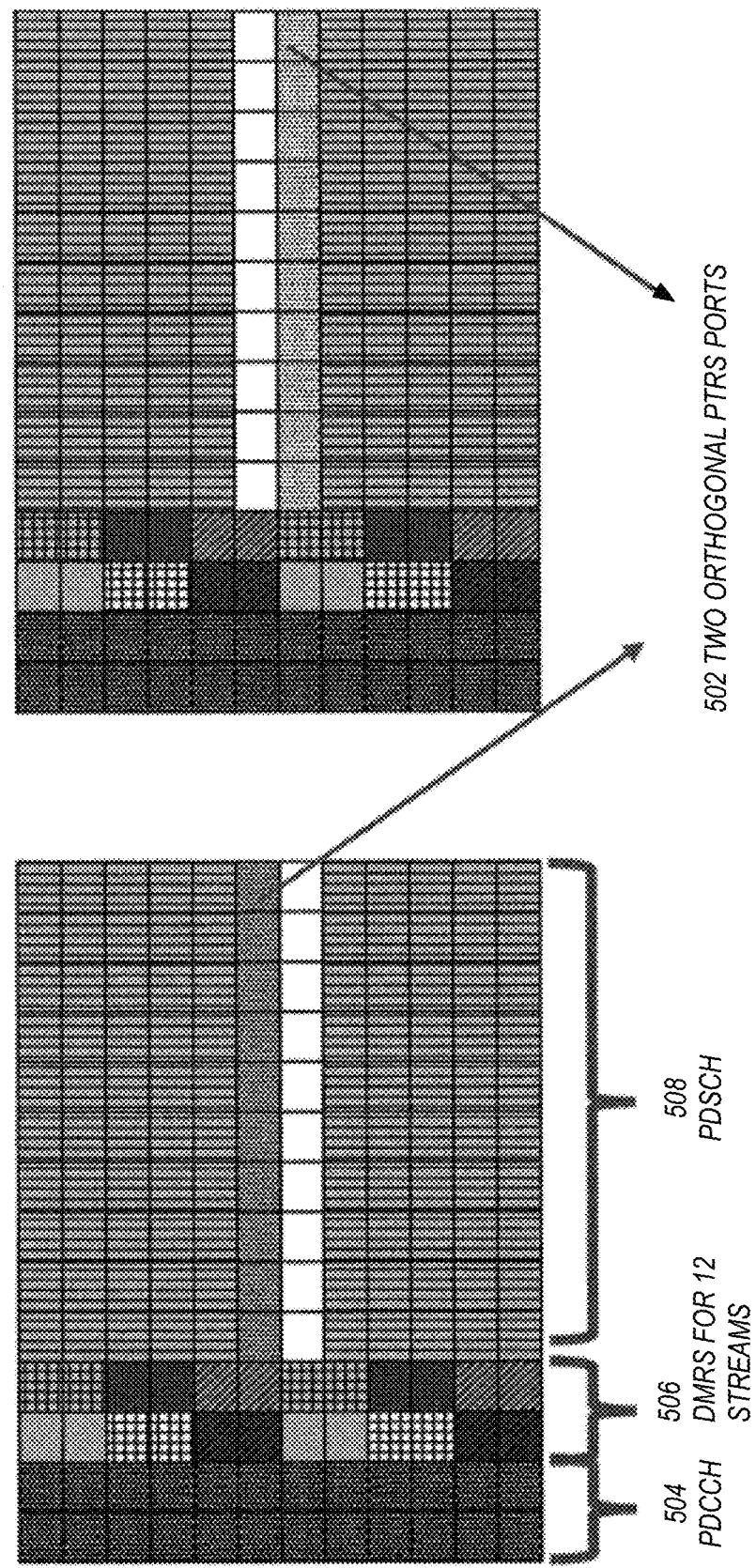
FIG. 5 provides an example diagram of two frames transmitted from a MIMO base station that include two orthogonal PTRS ports with the PDSCH.

FIG. 5 provides an example diagram of two subframes 500 transmitted from a MIMO base station that include two orthogonal PTRS ports 502 with the PDSCH 508. The PDCCH (physical downlink control channel) 504 symbols are included at the beginning of each frame followed by DMRS (demodulation reference signal) symbols 506 for 12 spatial streams.

Feedback of the Correlation of PN Between SS

The following methods are proposed to feedback the correlation from the UE to the base station. The base station can then use this feedback to allocate PTRS ports to UEs.
Feedback Method Type 1:
  Send back the raw or quantized version of the cross correlation matrix. The matrix looks like the matrix below:
    SS_xcorr=[C_1_1, C_1_2, . . . , C_1_N; C_2_1, C_2_2, C_2_3, . . . , C_2_N; . . . ; . . . ; C_N_1, C_N_2, . . . , C_N_N]

$$SS_{xcorr} = \begin{bmatrix} C_{11} & \cdots & C_{1N} \\ \vdots & \ddots & \vdots \\ C_{N1} & & C_{NN} \end{bmatrix}$$

It is noted that not all values may typically be estimated by a specific UE. It depends on the number of DMRS that a UE can receive. The UE can be configured to send feedback for cross correlation back to the gNB over a UCI (Uplink scheduling Control Information) message, a MAC CE (Media Access Control-Control Element), a RRC (Radio Resource Control) message, and/or some other desired message channel.

Example

If a TRP transmits SS 1, 2, 3, 4, 5, 6 in one DMRS group (which are usually Quasi Co-Located (QCLed)) and 6 other SS in a second DMRS group; and if UE1 is configured to receive data addressed to it in spatial streams 1, 2, 3, 4 out of the 12 SS transmitted by that TRP; and if UE1 can also receive the other DMRS in the group, i.e. corresponding to SS 5 and 6; then the UE1 can use the DMRS to equalize 6 out of the 12 spatial streams (i.e., SS 1, 2, 3, 4, 5, 6) even though only 4 contain data addressed to it. And UE1 can fill in a 6×6 cross correlation matrix.

After this matrix is prepared, it can be signaled back by the UE in a number of ways.
  Feedback all elements of the matrix: [C_1_1, C_1_2, . . . , C_1_N, C_2_1, C_2_2, C_2_3, . . . , C_2_N, . . . , C_N_1, C_N_2, . . . , C_N_N];
  Feedback only the off-diagonal terms of the matrix: [C_1_2, C_1_3, . . . , C_1_N, C_2_1, C_2_3, . . . , C_2_N, . . . , C_N_1, C_N_2, . . . , C_N_N−1];
  Feedback the averaged cross correlation per pair of Spatial Streams:
    combine C_1_2 and C_2_1 into Ceff_1_2=(C_1_2+C_2_1)/2
    send back [Ceff_1_2, Ceff_1_3, Ceff_1_4, . . . , Ceff_1_N, Ceff_2_3, Ceff_2_4, . . . , Ceff_2_N, Ceff_3_4, . . . , Ceff_3_N, Ceff_N−1_N];
  Feedback only those cross-correlation values which are above/below a certain threshold;
  Feedback only those cross-correlation values which are above/below a certain SS-specific threshold;
  Feedback quantized (e.g., linear or logarithmic) cross-correlation values, for example the cross-correlation value has to be mapped to a two-digit binary number; and/or
  Consider all the options mentioned above but feedback only those values that differ from the previous reporting.

It is further noted that additional and/or different feedback techniques could also be used by the UE to send cross correlation feedback information back to the TRP, such as a base station.
Feedback Method Type 2:
  In this method, the concept is to send back to the TRP the UE's suggestion for allocating the PTRS ports to it. The UE selects the optimum number of PTRS ports it needs and which DMRS ports with which they are associated using the cross correlation matrix it has computed. The raw cross correlation data is not sent back. Instead, the UE recommendation for the PTRS ports it needs is sent back. It is up to the base station scheduler to take into consideration such feedback from all relevant scheduled UEs and allocate the actual number of PTRS ports and map them to the DMRS ports and spatial streams. The feedback can be configured to be sent back to the gNB over a UCI message, a MAC CE, a RRC command, and/or some other desired message channel.

Example

Continuing the example from the feedback Type 1 above, the UE measures the 6×6 cross correlation matrix, and in this instance finds that the phase noise process on spatial streams 1 and 2 are highly correlated, and that those on spatial streams 3, 4, 5, 6 are highly uncorrelated. In that case, it may request the TRP to allocate five spatial streams and to map PTRS port 1 to DMRS port 1, to map no PTRS ports to DMRS port 2, and to map PTRS ports 2 through 5 to DMRS ports 3 through 6, respectively. It is noted that DMRS port 5 and 6 are used for another UE for this example.

Example Flow Diagrams

Figure 6:
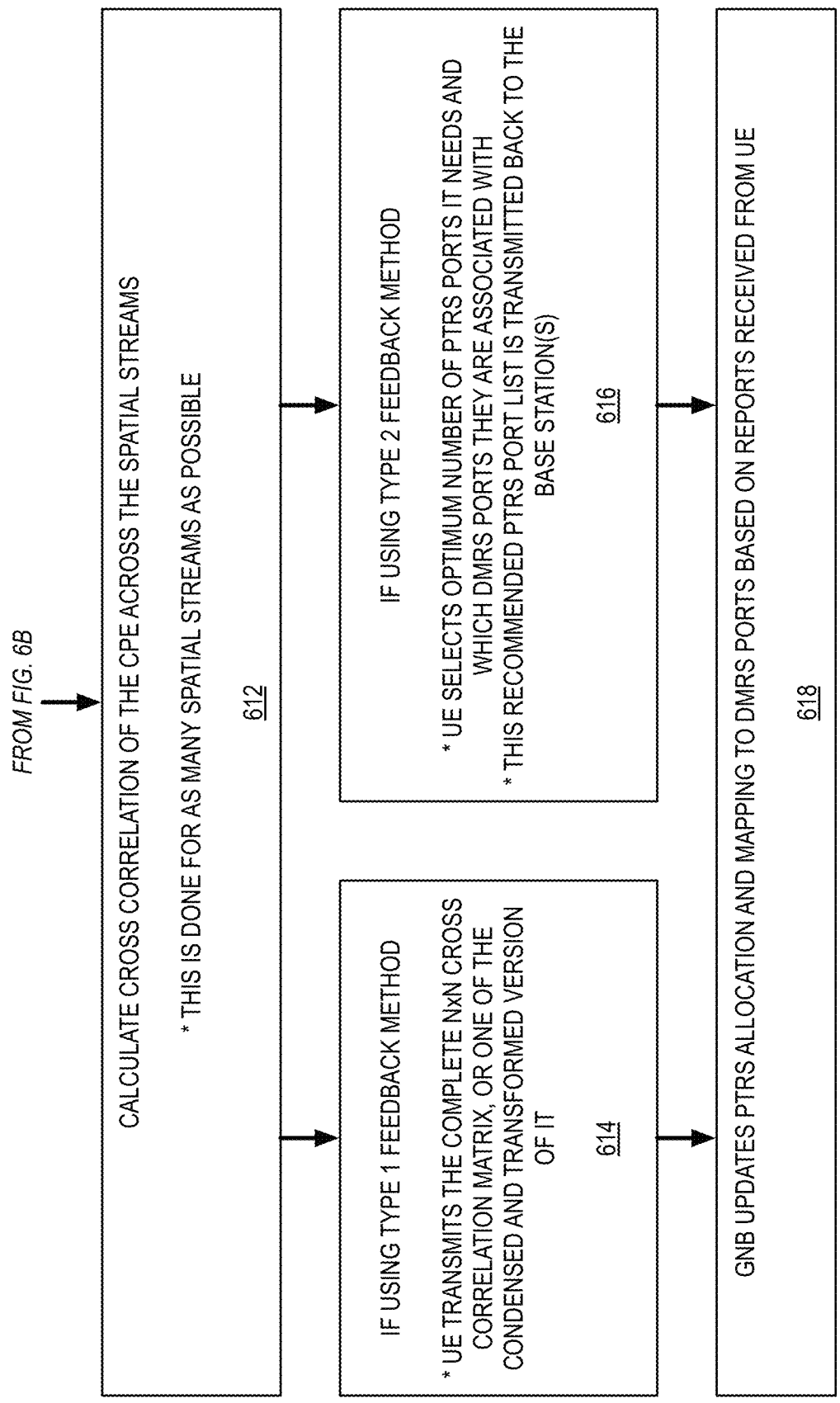
FIGS. 6A-C provide an example flow diagram for performing the PN correlation at the UEs and for the feedback of these correlations from the UE to the base station.

FIGS. 6A-C provide an example flow diagram for performing the PN correlation at the UEs and for the feedback of these correlations from the UE to the base station. It is noted that although the discussions herein focus on the DL, these methods can be extended to UL in a similar manner.

Looking first to FIG. 6A, at block 602, when PTRS communications are supported by the base station, the process starts off with transmitting Slot/TTI with 1 PTRS per DMRS port with some known time frequency density. Otherwise, there is lesser PTRS per DMRS ports according to some implicitly/explicitly indicated association rule. Further:

There is one DMRS port per spatial stream;
The spatial streams can be transmitted from any of the setups indicated: Multi TRP, One TRP, to single UE, to multiple UEs; and
Time frequency density/location can be implicitly/explicitly indicated to the UE.

Next, at block 604, at each UE scheduled in that TTI, the following are done in the front loaded DMRS symbol:
Estimate CPE per Spatial Stream using all the DMRS in the scheduled resource blocks for that UE; and
DMRS from spatial streams not meant for the given UE group or DMRS group are also used if possible (this is optional). If not, limit the CPE estimation to SS meant for that UE group or DMRS group only Next, at block 606, at each UE scheduled in that TTI, the following are done in the symbols that have PTRS (special case is if every PDSCH symbol has a PTRS):
Estimate CPE per Spatial Stream using all the PTRS in the scheduled resource blocks for that UE; and
PTRS from spatial streams not meant for the given UE are also used if possible (this is optional). If not, limit the CPE estimation to use PTRS in SS meant for that UE only.

Next, at block 608, at each UE scheduled in that TTI, if additional (non-front loaded) DMRS symbol present, the following are done:
Estimate CPE per Spatial Stream using all the DMRS in the scheduled resource blocks for that UE; and
DMRS from spatial streams not meant for the given UE group or DMRS group are also used if possible (this is optional). If not, limit the CPE estimates to SS meant for that UE group or DMRS group only Next, at block 609, if some of the symbols in the TTI contain a CSI-RS transmission, the UE can use the CSI-RS to derive the CPE if sufficient number of CSI-RS are available to achieve reliable CPE estimation.

Next, at block 611, at each UE scheduled in that TTI, if a selected PDSCH symbol has no DMRS or PTRS or CSI-RS, then estimate the CPE with blind method. This is done only in SS meant for that UE.

Next, at block 612, the cross correlation of the CPE is calculated across the spatial streams. This is done for as many SS as possible.

If the Type 1 Feedback method is being used, at block 614, the UE then transmits the complete N×N Cross Correlation matrix, or one of the condensed and transformed version of it, back to the base station.

If the Type 2 Feedback method is being used, at block 616, the UE then selects the optimum number of PTRS ports it needs and which DMRS ports with which they are associated. This recommended PTRS port list is transmitted back to the base station(s) by the UE.

Finally, at block 618, the base stations (e.g., gNB) updates PTRS allocation and mapping to DMRS ports based on reports received from UEs.

Extension/Modification for Multi TTI Operation

The following provides an extension of the example flow provided in FIGS. 6A-C for OFDM to multiple TTIs. The proposed method uses the CPE estimates from the last M number of TTIs for which a specific UE was scheduled with a similar transmission mode setup.

The proposed method for each TTI-i is as follows:
If the UE is scheduled with Transmission scheme setup Y:
Estimate CPE in each possible symbol of the TTI as provided in the example of FIGS. 6A-C; and
Obtain Time Series of CPE per symbol per spatial stream.
If previous TTI(s) that used same Transmission scheme Y were present:
Concatenate the CPE Estimates of Current TTI-i with the past TTI(s) and update the Cross Correlation Matrix (SS_xcorr); OR
Find SS_xcorr per individual TTI and combine them with either averaging or a variety of exponentially weighted averaging to get a new update of SS_xcorr.
Send back the updated SS_xcorr or the recommended PTRS port configuration settings back to the gNB depending on the Feedback Method Type 1 or 2 used.
Wait for next TTI when the UE is scheduled.

Extension/Modification for Single Carrier Modulations

For the case of single carrier waveforms [SC=Single Carrier Transmission Scheme], such as Null CP Single Carrier Waveform, or SC-FDMA or any of the other candidates in the single carrier family, the problem of phase noise estimation and compensation still exists. However, the OFDM type Common Phase Error (CPE) is not relevant as the phase noise does not need to be compensated in frequency (per subcarrier) and instead needs to be compensated in time.

Some techniques for such PN time compensation are:
Time domain Pilot aided compensation;
Time domain Cyclic Prefix aided compensation; and
Time domain blind compensation.

In addition, the proposed techniques described herein can be extended to such single carrier scenario. For example, consider a MU-MIMO type SC system where multiple UEs are scheduled on the same time frequency resource. Each UE gets a UE specific pilot that is pre-coded in the same manner as the data to the UE. This is called the SC DMRS pilot. There are additional SC PTRS pilots that can be used in the system. Each SC PTRS is associated to one or more SC DMRS port and share the same precoding as exactly one SC DMRS port. The algorithm can then be implemented the same as in FIGS. 6A-C above for the OFDM case but PTRS is replaced by SC PTRS and DMRS is replaced by SC DMRS.

As noted above, although the discussions herein focus on the DL, these methods can be extended to UL in a similar manner.

It is noted that the disclosed embodiments can be used with respect to a variety of OFDM-based transmission schemes for RF communication systems. It is also noted that as used herein, a "radio frequency" or RF communications means an electrical and/or electro-magnetic signal conveying useful information and having a frequency from about 3 kilohertz (kHz) to thousands of gigahertz (GHz) regardless of the medium through which such signal is conveyed. The OFDM-based transmissions may be transmitted through a variety of mediums (e.g., air, free space, coaxial cable, optical fibers, copper wire, metal layers, and/or other RF transmission mediums). As one example, the disclosed embodiments could be used for millimeter (mm) wave transmissions between 30-300 GHz having wavelengths of 1-10 mm (e.g., a transmission range of 71-76 GHz) if OFDM-based modulation were used for the mm wave transmissions. In addition, the disclosed embodiments will likely be useful for 5G solutions up to 40 GHz where OFDM-based modulations are more likely to be implemented. For example, 5G frequency ranges and bands around 28 GHz, 39 GHz, and/or other frequency ranges or bands where OFDM-based modulation is used for RF transmissions will benefit from the disclosed techniques. It is further noted that example wireless communication systems within which the disclosed techniques can be applied are also described in U.S. Published Patent Application No. 2015-0303936 (Ser. No. 14/257,944) and U.S. Published Patent Application No. 2015-0305029 (Ser. No. 14/691, 339), each of which is hereby incorporated by reference in its entirety.

Figure 7:
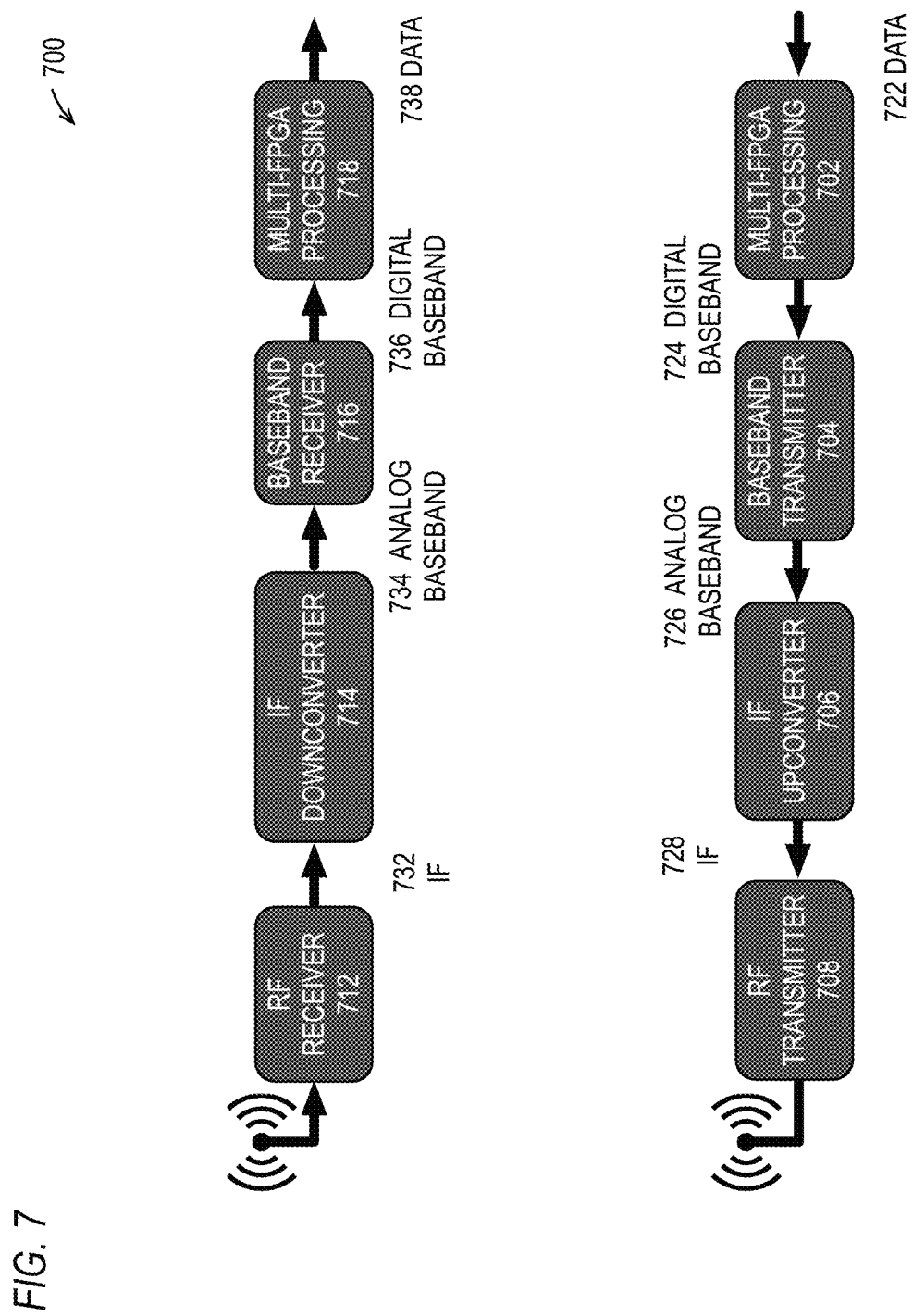
FIG. 7 is a block diagram of an example embodiment for a mm (millimeter) wave communication system that can use the disclosed techniques.

FIG. 7 is a block diagram of an example embodiment for a communication system 700 that can transmit and receive OFDM symbols as described herein. The example embodiment of FIG. 7 includes a transmit path and a receive path. The transmit path includes multi-FPGA processing circuitry 702, a baseband transmitter 704, an IF upconverter 706, and an RF transmitter 708. The receive path includes an RF receiver 712, an IF downconverter 714, a baseband receiver 716, and multi-FGPA processing circuitry 718. The transmit path and the receive path that are communicating with each other can be located in different devices (e.g., base station and user equipment for cellular communications). If bi-directional communications are desired, the different devices can each include a transmit path and a receive path. Other variations can also be implemented.

Looking to the transmit path, transmit data 722 is sent to multiple FPGAs 702 that provide multi-FPGA processing of the transmit data 722. The transmit data 722 can be generated by other processing circuitry such as a control processor or other circuitry. These FPGAs 702 can operate at a selected clock rate (e.g., 192 MS/s (mega samples per second) or other rate) and can use efficient parallel wide data path implementations, for example, with multiple (e.g. 16) data elements (e.g., baseband samples) per wide data path sample. The FPGAs 702 output digital baseband signals 724 to the baseband transmitter 704. The baseband transmitter 704 includes a digital-to-analog converter (DAC) that converts the digital baseband samples to analog baseband signals 726. The baseband transmitter 704 including the DAC can operate at a selected sampling rate (e.g., 3.072 GS/s (Giga samples per second) or other rate) and can receive digital baseband samples from one or multiple FPGAs 702 within the multi-FPGA processing circuitry. The analog baseband signals 726 are received by an IF (intermediate frequency) upconverter 706 that mixes the analog baseband signals 726 to higher frequency IF signals 728. These IF signals 728 are received by the RF transmitter 708 which further upconverts these signals to the frequency range of the desired transmissions.

Looking to the receive path, the receiver 712 receives the RF transmissions from the RF transmitter which can be within a desired frequency range. The RF receiver 712 downconverts these RF transmissions to lower frequency IF signals 732. The IF signals 732 are then received by an IF downconverter 714 that mixes the IF signals 732 down to analog baseband signals 734. The analog baseband signals 723 are then received by a baseband receiver 716. The baseband receiver 716 includes an analog-to-digital converter (ADC) that converts the analog baseband signals 734 to digital baseband signals 736. The baseband receiver 716 including the ADC can operate at a sampling rate (e.g., 3.072 GS/s (Giga samples per second) or other rate) and can send digital baseband samples 736 to one or multiple FPGAs within the multi-FPGA processing circuitry 718. The FPGAs 718 receive the digital baseband signals 736 and generate digital data that can be processed by additional processing circuitry such as a control processor or other circuitry. These FPGAs 718 can operate at a selected rate (e.g., 192 MS/s (mega samples per second) or other rate using efficient parallel wide data path implementations, for example, with multiple (e.g., 16) data elements (e.g., baseband samples) per wide data path sample.

Figure 8:
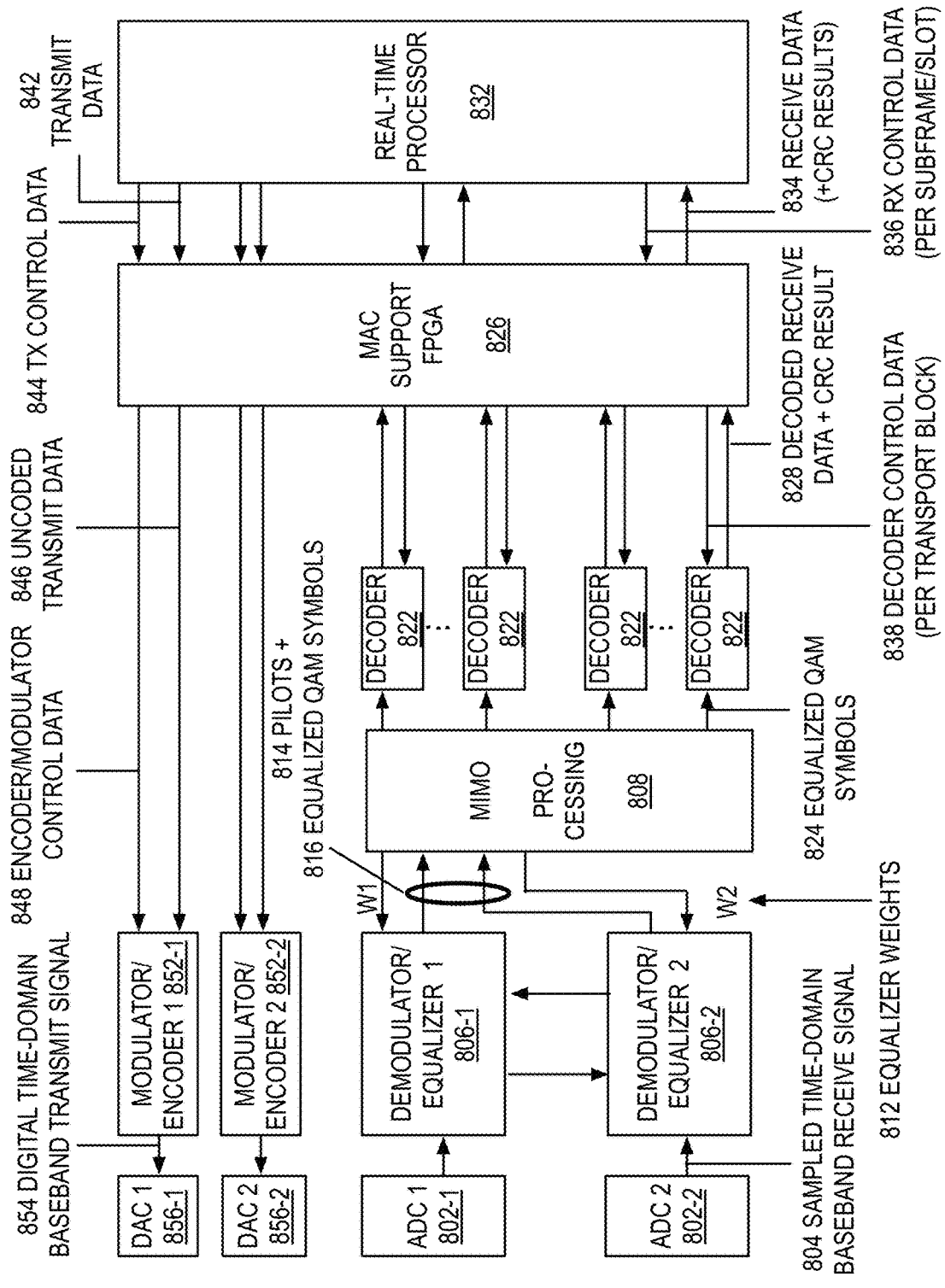
FIG. 8 is a block diagram of an example embodiment for circuitry that can be used to provide a baseband receiver, a baseband transmitter, multi-FPGA processing circuitry, and a real-time processor with respect to the embodiment of FIG. 7.

FIG. 8 is a block diagram of an example embodiment for circuitry that can be used to provide a baseband receiver, a baseband transmitter, multi-FPGA processing circuitry, and a real-time processor with respect to the embodiment of FIG. 7. The embodiment of FIG. 8 provides two receive/transmit streams and related processing circuitry.

Looking to the embodiment of FIG. 8, two analog-to-digital converters (ADC1 802-1, ADC2 802-2) receive analog baseband signals and output sampled digital baseband signals 804 (i.e., sampled time-domain baseband receive signals) to two demodulators/equalizers 806. The demodulators/equalizers (DEMODULATOR/EQUALIZER 1 806-1, DEMODULATOR/EQUALIZER 2 806-2) demodulate and equalize the respective receive signals. Due to the complexity of the MIMO (multiple input multiple output) equalization task, some parts of the related functionality are realized by a separate MIMO processing circuitry (MIMO PROCESSING 808). Specifically, this MIMO processing circuitry 808 performs the MIMO channel estimation and the calculation of the equalizer weights 812. For this, it uses the (pre-processed) pilot signals/symbols 814 extracted from both received baseband signals as input. These (pre-processed) pilot signals 814 are provided by the demodulators/equalizers 806. The equalizer weights 812 (W1, W2) calculated by the MIMO processing circuitry 808 are fed back to the demodulators/equalizers 806, which can perform the final MIMO equalization using these equalizer weights 812. To support this final MIMO equalization task, the demodulators/equalizers 806 can exchange intermediate equalization results. The final output of the demodulators/equalizers 806 are equalized QAM (quadrature amplitude modulation) symbols 816 for both receive streams. These equalized QAM symbols 816 are provided to the MIMO processing circuitry 808, which can distribute the equalized QAM symbols 824 to multiple decoders (DECODER 822). It is noted that the upper set of decoders 822 can be used for decoding the first receive stream and the lower set of decoders 822 can be used for decoding the second stream. The decoders 822 output decoded digital receive data 828 plus CRC (cyclic redundancy check) results per transport block to the MAC support FPGA 826. The MAC support FPGA 826 can collect the output data 828 of all decoders 822, can further process them, and can provide them to the real-time processor (REAL-TIME PROCESSOR 832) in a synchronized and consistent manner. The real-time processor 832 can perform further operations on the received data 828 (and CRC results) provided by the MAC support FPGA 826. Further, it can provide receiver (RX) control information 836 to the MAC support FPGA 826 and/or other receiver FPGAs (not shown) to control and configure the respective receivers. For example, the real-time controller 832 can provide the control data 836 for all decoders 822 per subframe to the MAC support FPGA 826, and the MAC support FPGA 826 can distribute these control data 838 to each decoder 822 to provide the configuration used to decode the related transport block. A similar functionality can be provided by the real-time processor 832 for the transmit paths. Uncoded digital transmit data 842 and related transmitter (TX) control data 844 are sent from the real-time processor 832 to the MAC support FPGA 826, which distributes the digital transmit data 846 as well as the respective encoder/modulator control data 848 to the two modulators/encoders (MODULATOR/ENCODER 1 852-1, MODULATOR/ENCODER 2 852-2). The modulators/encoders 852 encode the transmit data 846 and perform the transmit modulation, e.g., generate the digital time-domain baseband transmit signals 854. These digital time-domain baseband transmit signals 854 are sent by the modulators/encoders 852 to the digital-to-analog converters (DAC1 856-1, DAC2 856-2). The DACs 856 receive the digital baseband signals 854 and output analog baseband signals. It is noted that demodulators/equalizers, modulators/encoders, MIMO processing circuitry, and decoders can be implemented using multiple parallel FPGAs.

The disclosed embodiments can also be used for OFDM-based transmission schemes for massive MIMO cellular telecommunication systems as described in U.S. Published Patent Application 2015/0326291, entitled "SIGNALING AND FRAME STRUCTURE FOR MASSIVE MIMO CELLULAR TELECOMMUNICATION SYSTEMS," which is hereby incorporated by reference in its entirety. Such massive MIMO (multiple input, multiple output) communication systems can be used for 5G dynamic TDD (time division duplex) air interfaces. The 5G ($5^{th}$ generation) mobile telecommunications is able to span a wide variety of deployment scenarios (e.g., Rural, Urban Macro, Dense Urban, Indoor, etc.) in a flexible and scalable manner. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC).

The disclosed embodiments can also be used with CPE compensation techniques and related embodiments described in FIGS. 10 through 15 and in U.S. patent application Ser. No. 15/855,148, filed Dec. 27, 2017, which claims priority to U.S. Provisional Patent Application Ser. No. 62/443,226, entitled "BLIND COMMON PHASE ERROR (CPE) COMPENSATION FOR OFDM SYMBOLS IN WIRELESS COMMUNICATION SYSTEMS," each of which is hereby incorporated by reference in its entirety.

Figure 9:
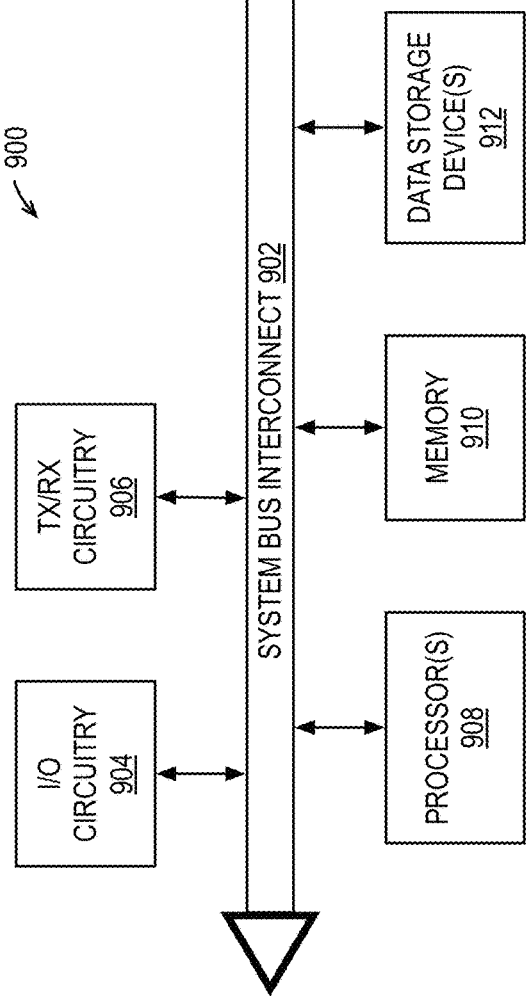
FIG. 9 is a diagram of an example embodiment for electronic components that can be used to implement a base station and/or user equipment (UE) for the disclosed embodiments.

FIG. 9 is a diagram of an example embodiment 900 for electronic components that can be used to implement a base station and/or user equipment (UE) including the functions and operational features described for the disclosed embodiments. For the example embodiment 900 shown in FIG. 9, one or more processors 908 communicate with other components through system bus interconnect 902. For example, the one or more processors 908 communicate with input/output (I/O) circuitry 904 and transmit/receive (TX/RX) circuitry 906 through the system bus interconnect 902. Additional circuitry can also be included such as power supply circuitry and/or other desired circuitry. The TX/RX circuitry 906 provides one or more cellular radios and are preferably coupled to a plurality of antennas through which the TX/RX circuitry transmits and receives RF (radio frequency) signals (e.g., from a few kHz to 10 GHz and above). The I/O circuitry 904 provides one or more interfaces for users, such as graphical user interfaces, and/or connections to peripheral devices (e.g., displays, keyboards, mice, point device, and/or other I/O peripheral devices). The memory 910 is also coupled to the system bus interconnect 902 and can be used by the one or more processors 908 to load and/or store instructions, data, and/or other information during operation. One or more data storage device(s) 912 are also connected to the system bus interconnect 902 and can store software or program instructions and/or other desired data or information for the operation of the processing system. For example, computer-readable instructions stored in the data storage devices 912 can be loaded within the memory 910 and then executed by the processor(s) 908 to carry out the functions described herein.

It is noted that different and/or additional components from those depicted in FIG. 9 could also be used to implement one or more radio systems for the embodiments described herein while still taking advantage of the techniques described herein. It is further noted that the system bus interconnect 902 can be implemented as multiple interconnection buses with our without additional intervening circuitry such as routing or switching circuitry. Further, the processor(s) 908 can be implemented using one or more programmable integrated circuits including controllers, microcontrollers, microprocessors, hardware accelerators, configurable logic devices (e.g., field programmable gate arrays), and/or other programmable integrated circuits that are programmed to carry out the function described herein. Further, the one or more processor(s) 908 can execute instructions stored in a non-transitory tangible computer-readable medium to perform the functions described herein. In addition, data storage device(s) 912 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 910 can be any data storage medium configured to maintain data storage when powered. Other variations could also be implemented.

It is also noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the techniques described herein.

Figure 10:
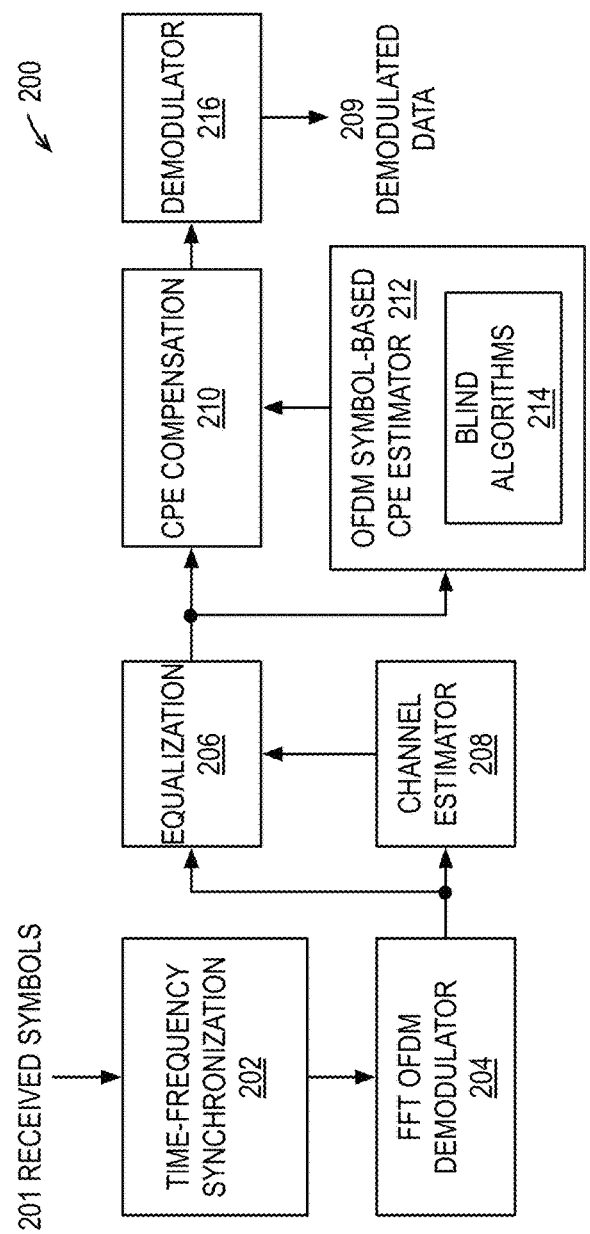
FIG. 10 is a block diagram of an example embodiment for symbol processing for OFDM transmissions including blind CPE estimation for CPE compensation.

Looking now to FIG. 10, a block diagram is provided of an example embodiment 200 for symbol processing for OFDM transmissions. A time-frequency synchronization processor 202 receives incoming symbols 201 from OFDM transmissions and aligns the start of each OFDM symbol 201 for the FFT (fast Fourier transform) operations. The FFT OFDM demodulator 204 receives the output of the time-frequency synchronization processor 202 and demodulates the OFDM symbol to extract subcarriers using an FFT operation. The channel estimator 208 receives the subcarriers and uses pilot information within the subcarriers to generate an estimate of the channel response. The equalization processor 206 receives the channel estimate from the channel estimator 208 and applies it to the extracted subcarriers from the OFDM demodulator 204 to generate equalized OFDM subcarriers. The CPE estimator 212 receives the equalized OFDM subcarriers and applies one or more blind algorithms 214 (e.g., pilot-aided blind method, blind-only method) to generate a CPE estimate, although pilot only estimation can also be applied. The CPE compensation processor 210 then receives the CPE estimate from the CPE estimator 212 and applies it to the equalized OFDM subcarriers to compensate for the CPE. The compensated OFDM subcarriers are then demodulated by the demodulator 216 to generate demodulated data 209. For example, this demodulation can produce a decision regarding which constellation point was transmitted within a modulation scheme (e.g., 16 QAM) applied to the transmitted symbols for processing.

Figure 11:
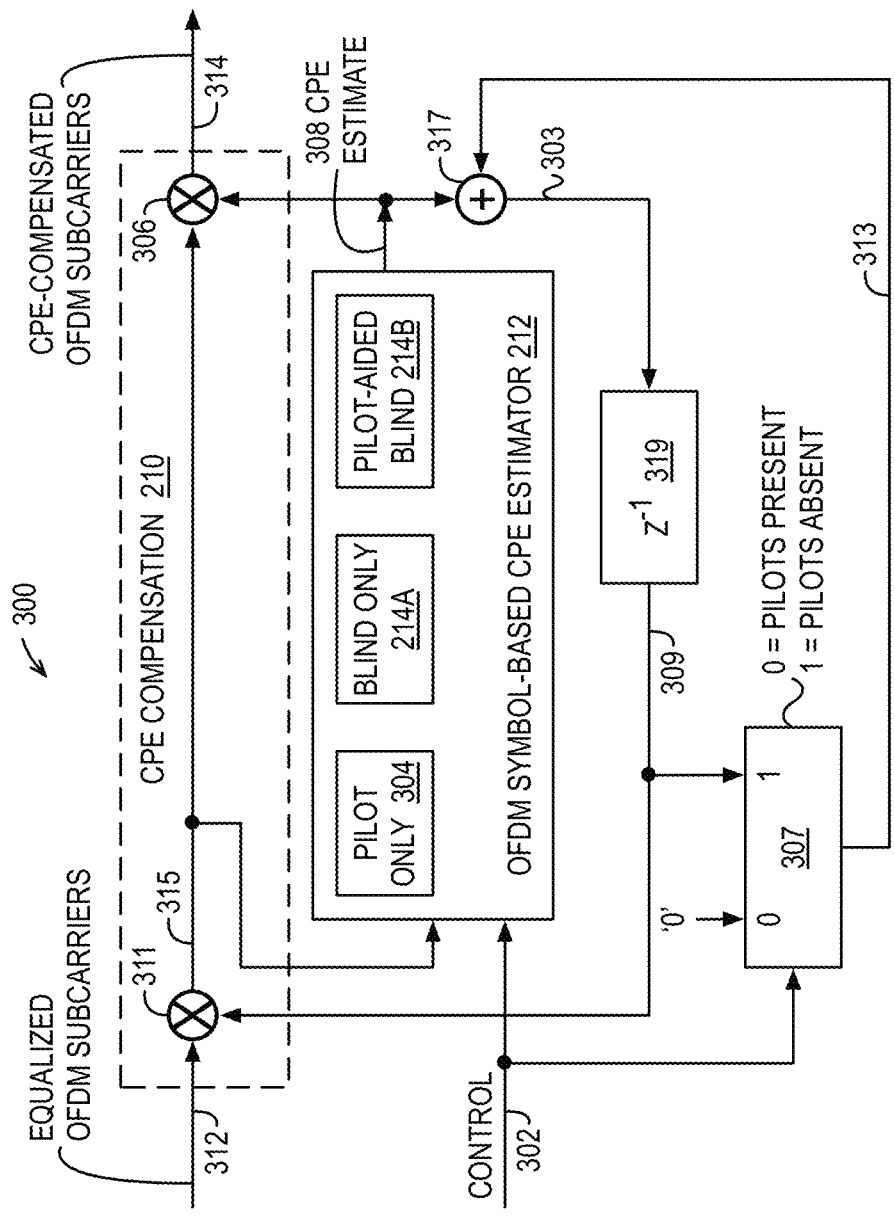
FIG. 11 is a block diagram of an example embodiment where the CPE estimator includes multiple estimation algorithms including a pilot only CPE estimation algorithm, a blind only CPE estimation algorithm, and a pilot aided blind CPE estimation algorithm.

FIG. 11 is a block diagram of an example embodiment 300 where the CPE estimator 212 includes multiple estimation algorithms including a pilot only CPE estimation algorithm 304, a blind only CPE estimation algorithm 214A, and a pilot aided blind CPE estimation algorithm 214B. The CPE estimator 212 receives a control signal 302 that determines which CPE estimation algorithm is applied to any particular OFDM symbol. This control signal 302, for example, can be generated by one or more control processors. For the embodiment, the CPE compensator 210 includes a digital mixer 306 that mixes the CPE estimate 308 from the CPE estimator 212 with a compensated, or de-rotated, version 315 of the equalized OFDM subcarriers 312 to generate the CPE compensated OFDM subcarriers 314. The CPE estimate 308 is provided to an accumulator 317 that accumulates the CPE estimate 308 with the output 313 of a selector 307 to produce an accumulated CPE estimate 303, which is provided to a delay block 319 that delays the accumulated CPE estimate 303 by one OFDM symbol. Thus, the delay block 319 produces an accumulated CPE estimate 309 associated with the previous OFDM symbol, whereas the accumulator 317 produces an accumulated CPE estimate 303 associated with the current OFDM symbol. The delayed accumulated CPE estimate 309 is provided to an input of the selector 307 and a zero value is provided to the other input of the selector 307. The control signal 302 controls the selector 307 to select the delayed CPE estimate 309 when the current OFDM symbol is absent pilot symbols for estimating CPE and selects the zero input when pilot symbols for estimating CPE are present, or embedded, in the current OFDM symbol, as well as when the system is at rest and in response to the receiver transitioning to the blind-only method 214A from the pilot-only method 304 or pilot-aided method 214B. The delayed accumulated CPE estimate 309 is also provided to a second mixer 311 that mixes the equalized subcarriers 312 of the current OFDM symbol to generate the compensated version 315 of the equalized OFDM subcarriers 312. The compensated version 315 of the equalized OFDM subcarriers 312 are also provided to the CPE estimator 212, which uses them to compute the CPE estimate 308. Preferably, the digital mixer 306 forms a unitary amplitude complex value having a phase, or offset angle, that is a negated version of the CPE estimate 308 and multiplies the compensated version of the equalized OFDM subcarriers 315 by the formed complex value to generate the CPE compensated OFDM subcarriers 314. Similarly, the second mixer 311 forms a unitary amplitude complex value having a phase, or offset angle, that is a negated version of the delayed accumulated CPE estimate 309 and multiplies the equalized OFDM subcarriers 312 by the formed complex value to generate the compensated version 315 of the equalized OFDM subcarriers 312. As described above, the CPE estimator 212 uses the de-rotated/compensated equalized subcarriers 315 to generate the CPE estimate 308. For example, in the case of an N-subcarrier FFT, the CPE estimator 212 uses N subcarriers to generate the CPE estimate 308, and the mixer 306 applies the CPE estimate 308 to the N subcarriers. It is noted that in the case of an OFDM symbol embedded with pilot symbols that are used to compute the CPE estimate 308, the mixer 311 will not modify the equalized OFDM subcarriers 312 (i.e., will mix them with a unitary value by operation of the selector 307 to output a zero-valued phase, or angle, that, as the exponent of the formed complex value, will cause it to be unitary).

It is noted that the methods and related systems are provided that adapt the density of the PN reference signals or pilots within the OFDM transmissions in a dynamic and/or semi-static manner based on the performance of the purely pilot aided CPE compensation method 304, blind CPE compensation method 214A, and/or the pilot aided blind CPE compensation method 214B. This density of PN reference signals or pilots can be adapted in time and/or frequency. In addition, a receiving device (e.g., one or more UEs) can send control messages back to a transmitting device (e.g., one or more base stations) indicating the performance level associated with the CPE compensation methods being employed. For example, the number of symbols within a duration including PN reference signals or pilots can be reduced by the transmitting device as long as the pilot aided CPE compensation method continues to provide adequate performance. Once all PN reference signals are removed, the blind CPE compensation method 214A can be used as long as it continues to provide adequate performance. Other variations could also be implemented while still taking advantage of the blind CPE estimation techniques described herein.

FIG. 12 is a process flow diagram of an example embodiment 400 for a blind only CPE estimation algorithm for the CPE estimator 212. As a fully blind method, no pilots are necessary for embodiment 400 and no pilot overhead is required. For every symbol, the phase noise is estimated using a blind algorithm. It is noted that one or more of various PN estimators can be used for the blind CPE estimation. For the example embodiment 400, a threshold and average estimation method is used where received IQ points are thresholded and within each thresholding region, the phase of the I and Q components are averaged to derive the CPE estimate. A power law PN estimation method could also be used where received IQ points are raised to their Mth power, and the result is averaged and then post processed to derive the CPE estimate. Other blind PN estimation methods could also be used without requiring PN reference signals or other pilots to provide CPE estimation. An example of a fourth-power law estimation method that may be used in a QAM constellation that has quadrant symmetry (i.e., is symmetric with respect to phase $$\frac{\pi}{2},$$

e.g., square or cross-QAM constellations) is shown in equation (1) below.

$$\theta = \frac{1}{4}\text{angle}\left[E(X^{*4}(n))\frac{\sum_{n=1}^{N} Y^4(n)}{N}\right] \quad (1)$$

In equation (1), $\theta$ is the CPE estimate, E is the expectation operator, X(n) are the values of the known transmitted QAM constellation signal set, the * operator denotes the complex conjugate of the value (in this case, the subcarrier), Y(n) are the received subcarriers of the OFDM symbol, and N is the OFDM symbol size, i.e., the number of subcarriers.

Figure 14:
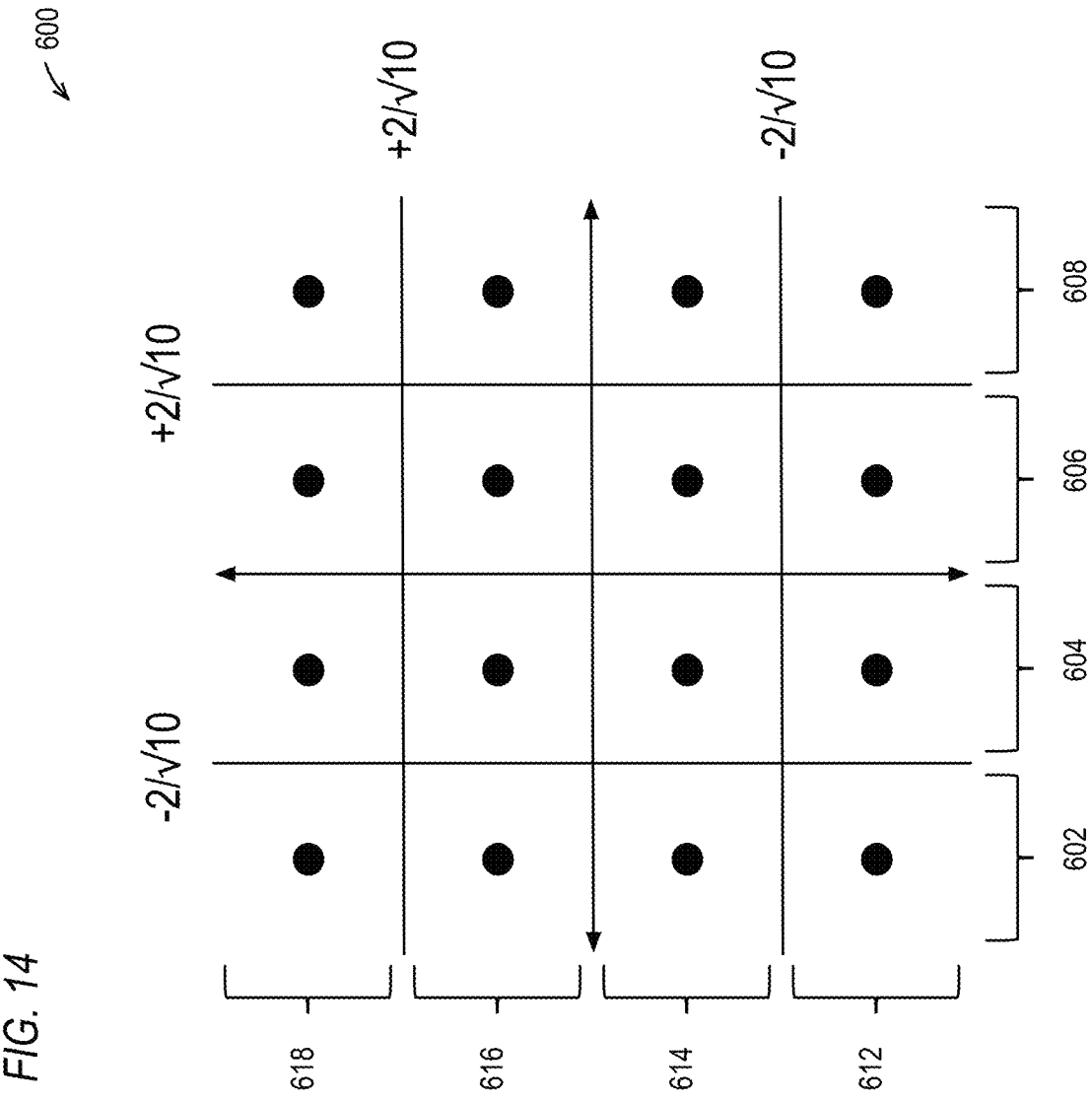
FIG. 14 is a diagram of an example embodiment for decision thresholds for the different 16-QAM threshold regions described with respect to FIG. 12.
Figure 15:
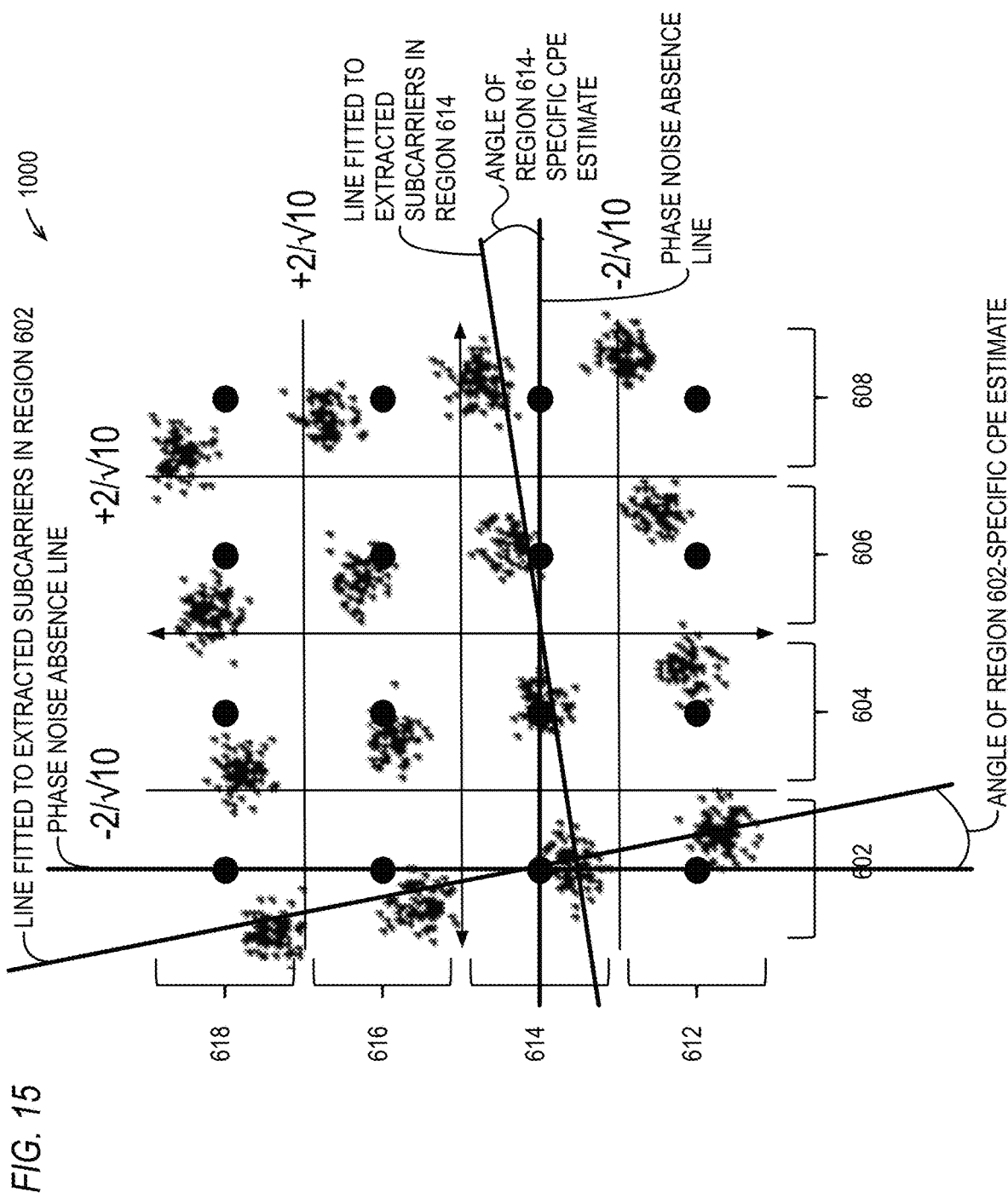
FIG. 15 is a diagram of an example embodiment employing the 8 decision thresholds for the different 16-QAM threshold regions of FIG. 14 and employing the embodiment of FIG. 12 method to extract subsets of data subcarriers of an OFDM symbol that fall within the 8 regions, i.e., the four real part regions and the four imaginary part regions.

Looking in more detail to FIG. 12, the initial CPE estimate is initially set to zero in block 402. In block 404 (STEP 2), a set of decision regions is defined. For example, a set of eight regions of a 16-QAM modulation constellation may be defined, as shown in FIG. 14 as 602, 604, 606, 608, 612, 614, 616 and 618, as described below in more detail. In block 406 (STEP 3), data is extracted for all data subcarriers within one of the regions defined in block 404 (STEP 2). For example, all the data subcarriers with a real (I) magnitude within region 602 may be extracted, e.g., I≤−2/sqrt(10), where "sqrt" is a square root function. In block 408 (STEP 4), the CPE is estimated on the set of data previously extracted in block 406 (STEP 3) to obtain a partial CPE estimate. For example, a linear fitting algorithm can be applied to the extracted data, as shown in FIG. 15. Examples of linear fitting schemes include least square estimation, maximum likelihood, Bayesian linear regression, and other linear fitting schemes. In block 410 (STEP 5), the processing in blocks 406 and 408 (STEPS 3 and 4) are repeated to cover all remaining regions defined in block 404 (STEP 2) to obtain a partial CPE estimate for each region. In block 412 (STEP 6), all the partial CPE estimates from the threshold regions obtained according to blocks 406, 408 and 410 (STEPS 3, 4 and 5) are combined, for example by averaging, to generate a final blind CPE estimate. As noted below, different threshold values and regions could also be used, and the number of threshold regions could also be adjusted.

FIG. 13 is a process flow diagram of an example embodiment 500 for a pilot aided blind CPE estimation algorithm for the CPE estimator 212. This embodiment provides a combination of the fully blind method above with traditional pilot aided CPE estimation methods. One traditional approach to reduce the PN pilot overhead for pilot aided CPE estimation is to have pilots only on intermittent symbols, for example on every second OFDM symbol. In embodiment 400, the pilot aided CPE estimate is started as the baseline. The blind estimator is then run on the symbols that do not have the pilots embedded in them.

Looking in more detail to FIG. 13, it is assumed that a traditional pilot only CPE estimation has already been run. In block 502 (STEP 1), the initial CPE estimate is set to the result of the pilot only based CPE estimate of the most recent symbol with an embedded PN reference signal or pilot. In block 504 (STEP 2), blocks 404, 406, 408, and 410 (STEPS 2-5) of embodiment 400 for fully blind CPE estimation are performed for all subsequent symbols without PN pilots. In block 506 (STEP 3), the initial pilot CPE estimate from block 502 (STEP 1) is combined with the blind CPE estimate from block 504 (STEP 2) to generate final pilot aided blind CPE estimate. The initial pilot CPE estimate may be combined with the blind CPE estimate by accumulating the two estimates and continuing to accumulate succeeding estimates, as shown in the embodiment of FIG. 11, for example.

FIG. 14 is a diagram of an example embodiment 600 for decision thresholds for the different 16-QAM threshold regions described above with respect to FIG. 12. The x-axis represents the real (I) magnitudes for the modulation scheme, and the y-axis represents the imaginary (Q) magnitudes for the modulation scheme. For the real (I) thresholds regions, region 602 includes values for I such that $I \leq -2/\sqrt{10}$; region 604 includes values for I such that $-2/\sqrt{10} < I \leq 0$; region 606 includes values for I such that $0 < I \leq 2/\sqrt{10}$; and region 608 includes values for I such that $I > 2/\sqrt{10}$. For the imaginary (Q) thresholds regions, region 612 includes values for Q such that $Q \leq -2/\sqrt{10}$; region 614 includes values for Q such that $-2/\sqrt{10} < Q \leq 0$; region 616 includes values for Q such that $0 < Q \leq 2/\sqrt{10}$; and region 618 includes values for Q such that $Q > 2/\sqrt{10}$. It is noted that different threshold values and regions could also be used, and the number of threshold regions could also be adjusted. For example, for 64-QAM modulation 16 different threshold regions could be used, and for QPSK modulation four different threshold regions could be used, respectively. Other variations could also be implemented while still taking advantage of the blind CPE estimation techniques described herein.

It is noted that the disclosed embodiments can be used with respect to a variety of OFDM-based transmission schemes for RF communication systems. It is also noted that as used herein, a "radio frequency" or RF communications means an electrical and/or electro-magnetic signal conveying useful information and having a frequency from about 3 kilohertz (kHz) to thousands of gigahertz (GHz) regardless of the medium through which such signal is conveyed. The OFDM-based transmissions may be transmitted through a variety of mediums (e.g., air, free space, coaxial cable, optical fibers, copper wire, metal layers, and/or other RF transmission mediums). As one example, the disclosed embodiments could be used for millimeter (mm) wave transmissions between 30-300 GHz having wavelengths of 1-10 mm (e.g., a transmission range of 71-76 GHz) if OFDM-based modulation were used for the mm wave transmissions. In addition, the disclosed embodiments will likely be useful for 5G solutions up to 40 GHz where OFDM-based modulations are more likely to be implemented. For example, 5G frequency ranges and bands around 28 GHz, 39 GHz, and/or other frequency ranges or bands where OFDM-based modulation is used for RF transmissions will benefit from the blind CPE compensation techniques described herein for the disclosed embodiments. It is further noted that example wireless communication systems within which the disclosed blind CPE compensation techniques can be applied are also described in U.S. Published Patent Application No. 2015-0303936 (Ser. No. 14/257,944) and U.S. Published Patent Application No. 2015-0305029 (Ser. No. 14/691,339), each of which is hereby incorporated by reference in its entirety.

FIG. 15 is a diagram of an example embodiment 1000 employing the 8 decision thresholds for the different 16-QAM threshold regions of FIG. 14 and employing the embodiment of FIG. 12 method to extract subsets of data subcarriers of an OFDM symbol that fall within the 8 regions, i.e., the four real part regions 602, 604, 606 and 608, and the four imaginary part regions 612, 614, 616 and 618. FIG. 15 further illustrates fitting a line to the extracted subcarriers that fall within region 602 (one of the four vertical real part regions) and computing the angle between the fitted line and a phase noise absence line (e.g., a vertical line) to obtain the region 602-specific CPE estimate. FIG. 15 further illustrates fitting a line to the extracted subcarriers that fall within region 614 (one of the four horizontal imaginary part regions) and computing the angle between the fitted line and a phase noise absence line (e.g., a horizontal line) to obtain the region 614-specific CPE estimate. Similar subcarrier extractions, line fitting, and CPE estimate calculations may be performed for additional regions, as necessary, and then the region-specific CPE estimates can be averaged to obtain a final, or overall, CPE estimate for the OFDM symbol, e.g., according to FIG. 12. As described above, the estimated angle may form the phase of a unitary amplitude complex number to be multiplied by each subcarrier of an OFDM symbol to accomplish compensation of the CPE in the OFDM symbol subcarriers. It is noted that the extracted subcarriers upon which the lines are fit are compensated/de-rotated subcarriers (e.g., output 315 of mixer 311 of FIG. 11), which may advantageously result in a more accurate CPE estimate 308 by decreasing the likelihood that the individual subcarriers will be extracted into the wrong region. As described above, advantageously the number of regions for which region-specific CPE estimates may be computed and averaged may vary based on available computing power and needed CPE compensation efficiency.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:
1. A wireless base station (BS), comprising:
   a plurality of radio frequency (RF) chains mapped to a plurality of antennas; and
   one or more local oscillators (LO) configured to generate LO signals for provision to the RF chains;
   wherein the BS is configured to:
     transmit a plurality of spatial streams from the plurality of antennas;

receive feedback about cross-correlations of common phase error (CPE) estimates among the plurality of spatial streams from a plurality of user equipment (UE); and use the CPE cross-correlation feedback to allocate phase tracking reference signal (PTRS) ports and to map the allocated PTRS ports to demodulation reference signal (DMRS) ports corresponding to the plurality of spatial streams.

2. The wireless BS of claim 1,
wherein to use the CPE cross-correlation feedback to allocate PTRS ports and to map the allocated PTRS ports to DMRS ports, the BS determines that N of the spatial streams are highly correlated and maps fewer than N PTRS ports to the N DMRS ports corresponding to the N spatial streams.

3. The wireless BS of claim 1,
wherein the CPE cross-correlation feedback comprises a recommendation of a number of PTRS ports needed by the UE and a mapping of the needed PTRS ports to DMRS ports.

4. The wireless BS of claim 1,
wherein the CPE cross-correlation feedback comprises at least a portion of a cross correlation matrix of the estimated CPE across the plurality of spatial streams.

5. A user equipment (UE), comprising:
one or more radio frequency (RF) chains mapped to one or more antennas; and
one or more local oscillators (LO) configured to generate LO signals for provision to the one or more RF chains;
wherein the UE is configured to:
    receive a plurality of spatial streams transmitted from a base station (BS);
    estimate common phase error (CPE) of each of the plurality of spatial streams;
    measure cross-correlations of the estimated CPE among the plurality of spatial streams; and
    provide feedback about the CPE cross-correlations to the BS for use by the BS to allocate phase tracking reference signal (PTRS) ports and to map the allocated PTRS ports to demodulation reference signal (DMRS) ports corresponding to the plurality of spatial streams.

6. The UE of claim 5,
wherein to provide CPE cross-correlation feedback, the UE provides a recommendation of a number of PTRS ports needed by the UE and a mapping of the needed PTRS ports to DMRS ports.

7. The UE of claim 5,
wherein to measure cross-correlations of the estimated CPE among the plurality of spatial streams, the UE calculates a cross correlation matrix of the estimated CPE across the plurality of spatial streams; and
wherein to provide CPE cross-correlation feedback, the UE provides at least a portion of the cross-correlation matrix.

8. The UE of claim 5,
wherein the plurality of spatial streams comprises at least one spatial stream containing data addressed to the UE and at least one spatial stream containing data addressed to another of the plurality of UE.

9. The UE of claim 5,
wherein to use the CPE cross-correlation feedback to allocate PTRS ports and to map the allocated PTRS ports to DMRS ports, the BS determines that N of the spatial streams are highly correlated and maps fewer than N PTRS ports to the N DMRS ports corresponding to the N spatial streams.

10. The UE of claim 5,
wherein to estimate CPE of each spatial stream of the plurality of spatial streams, the UE estimates CPE of one or more reference signals corresponding to the spatial stream received by the UE from the following list of reference signals:
a DMRS;
a PTRS; and
a channel state information reference signal (CSI-RS).

11. The UE of claim 5, wherein to estimate CPE of each spatial stream of the plurality of spatial streams, the UE blindly estimates CPE of an OFDM symbol received by the UE.

12. A method, comprising:
transmitting, by a base station (BS) having a plurality of antennas, a plurality of spatial streams;
by each user equipment (UE) of a plurality of UE:
    estimating common phase error (CPE) of each of two or more of the plurality of spatial streams;
    measuring cross-correlations of the estimated CPE among the two or more of the plurality of spatial streams; and
    providing feedback about the CPE cross-correlations to the BS; and
using, by the BS, the CPE cross-correlation feedback to allocate phase tracking reference signal (PTRS) ports and to map the allocated PTRS ports to demodulation reference signal (DMRS) ports corresponding to the plurality of spatial streams.

13. The method of claim 12,
wherein, for each UE of the plurality of UE, said providing CPE cross-correlation feedback comprises providing a recommendation of a number of PTRS ports needed by the UE and a mapping of the needed PTRS ports to DMRS ports.

14. The method of claim 12,
wherein said measuring cross-correlations of the estimated CPE among the two or more of the plurality of spatial streams comprises calculating a cross correlation matrix of the estimated CPE across the two or more of the plurality of spatial streams; and
wherein said providing CPE cross-correlation feedback comprises providing at least a portion of the cross-correlation matrix.

15. The method of claim 12,
wherein the two or more of the plurality of spatial streams each of whose CPE is estimated comprises at least one spatial stream containing data addressed to the UE and at least one spatial stream containing data addressed to another of the plurality of UE.

16. The method of claim 12,
wherein said using the CPE cross-correlation feedback to allocate PTRS ports and to map the allocated PTRS ports to DMRS ports comprises determining that N of the spatial streams are highly correlated and mapping fewer than N PTRS ports to the N DMRS ports corresponding to the N spatial streams.

17. The method of claim 12,
wherein said estimating CPE of each spatial stream of two or more of the plurality of spatial streams comprises estimating CPE of one or more reference signals corresponding to the spatial stream received by the UE from the following list of reference signals:

a DMRS;
a PTRS; and
a channel state information reference signal (CSI-RS).

18. The method of claim 12,
wherein said estimating CPE of each spatial stream of two or more of the plurality of spatial streams comprises blindly estimating CPE of an OFDM symbol received by the UE.

19. The method of claim 12,
wherein said measuring cross-correlations of the estimated CPE among the two or more of the plurality of spatial streams comprises comparing a time series of CPE estimated over multiple symbols of one or more transmission time intervals (TTI).

20. The method of claim 19,
wherein the one or more transmission time intervals (TTI) comprises a plurality of TTI; and
wherein said measuring cross-correlations of the estimated CPE among the two or more of the plurality of spatial streams comprises updating a cross correlation matrix using CPE estimated from one or more symbols of a current one of the plurality of TTI, wherein the cross correlation matrix comprises a matrix of the estimated CPE across the two or more of the plurality of spatial streams maintained over the time series of CPE estimated over multiple symbols of the plurality of TTI.

* * * * *